(12) United States Patent
Ohtani et al.

(10) Patent No.: US 11,933,742 B2
(45) Date of Patent: Mar. 19, 2024

(54) INSPECTION DEVICE, PACKAGING MACHINE, AND PACKAGE INSPECTION METHOD

(71) Applicant: CKD CORPORATION, Aichi (JP)

(72) Inventors: Takamasa Ohtani, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 364 days.

(21) Appl. No.: 17/514,707

(22) Filed: Oct. 29, 2021

(65) Prior Publication Data

US 2022/0050066 A1 Feb. 17, 2022

Related U.S. Application Data

(63) Continuation of application No. PCT/JP2020/011757, filed on Mar. 17, 2020.

(30) Foreign Application Priority Data

May 16, 2019 (JP) .................................. 2019-092745

(51) Int. Cl.
  *G01N 23/04* (2018.01)
  *A61J 1/03* (2023.01)
  *G01N 23/083* (2018.01)

(52) U.S. Cl.
  CPC ................ *G01N 23/04* (2013.01); *A61J 1/03* (2013.01); *G01N 23/083* (2013.01);
  (Continued)

(58) Field of Classification Search
  None
  See application file for complete search history.

(56) References Cited

U.S. PATENT DOCUMENTS

| 11,808,714 B2 * | 11/2023 | Taguchi .................. B65B 5/103 |
| 2007/0172129 A1 * | 7/2007 | Tortora ................ G06V 10/757 |
| | | 382/218 |

(Continued)

FOREIGN PATENT DOCUMENTS

| JP | 2011-033505 A | 2/2011 |
| JP | 2011-149738 A | 8/2011 |

(Continued)

OTHER PUBLICATIONS

International Search Report issued in corresponding International Application No. PCT/JP2020/011757 dated Jun. 30, 2020 (7 pages).

(Continued)

*Primary Examiner* — Edwin C Gunberg
(74) *Attorney, Agent, or Firm* — Osha Bergman Watanabe & Burton LLP

(57) ABSTRACT

An inspection device includes: an electromagnetic wave irradiator that irradiates, with a predetermined electromagnetic wave from a first film side, the package that is conveyed along a predetermined direction and that has the spaces at a plurality of positions in a width direction; an imaging device that is disposed opposed to the electromagnetic wave irradiator across the package, includes an electromagnetic wave detector including a plurality of detection elements that is arrayed along the width direction and that detects the electromagnetic wave radiated from the electromagnetic wave irradiator and transmitted through the package, and sequentially outputs an obtained electromagnetic wave transmission image every time the package is conveyed by a predetermined amount; and an image processing device that processes an image signal output from the imaging device.

17 Claims, 13 Drawing Sheets

(52) U.S. Cl.
CPC ....... *A61J 2200/70* (2013.01); *G01N 2223/04* (2013.01); *G01N 2223/401* (2013.01); *G01N 2223/643* (2013.01)

(56) References Cited

U.S. PATENT DOCUMENTS

| | | | | |
|---|---|---|---|---|
| 2016/0180515 | A1* | 6/2016 | Seo | ............... A23P 20/00 |
| | | | | 382/110 |
| 2018/0305058 | A1* | 10/2018 | Maruyama | ............. B65B 57/10 |
| 2020/0182799 | A1* | 6/2020 | Inoguchi | ............... G01N 21/86 |
| 2020/0182800 | A1* | 6/2020 | Inoguchi | ........... G01N 21/8901 |
| 2020/0333256 | A1* | 10/2020 | Taguchi | ............... B29C 51/266 |
| 2021/0278350 | A1* | 9/2021 | Taguchi | ............... G01N 21/359 |
| 2021/0387761 | A1* | 12/2021 | Ohtani | ................ B65B 57/10 |

FOREIGN PATENT DOCUMENTS

| | | |
|---|---|---|
| JP | 2012-225666 A | 11/2012 |
| JP | 2013-253832 A | 12/2013 |
| JP | 2014-085190 A | 5/2014 |
| JP | 2016-024096 A | 2/2016 |

OTHER PUBLICATIONS

Written Opinion issued in corresponding International Application No. PCT/JP2020/011757 dated Jun. 30, 2020 (6 pages).
International Preliminary Report on Patentability issued in corresponding International Application No. PCT/JP2020/011757 dated Nov. 16, 2021 (17 pages).

* cited by examiner

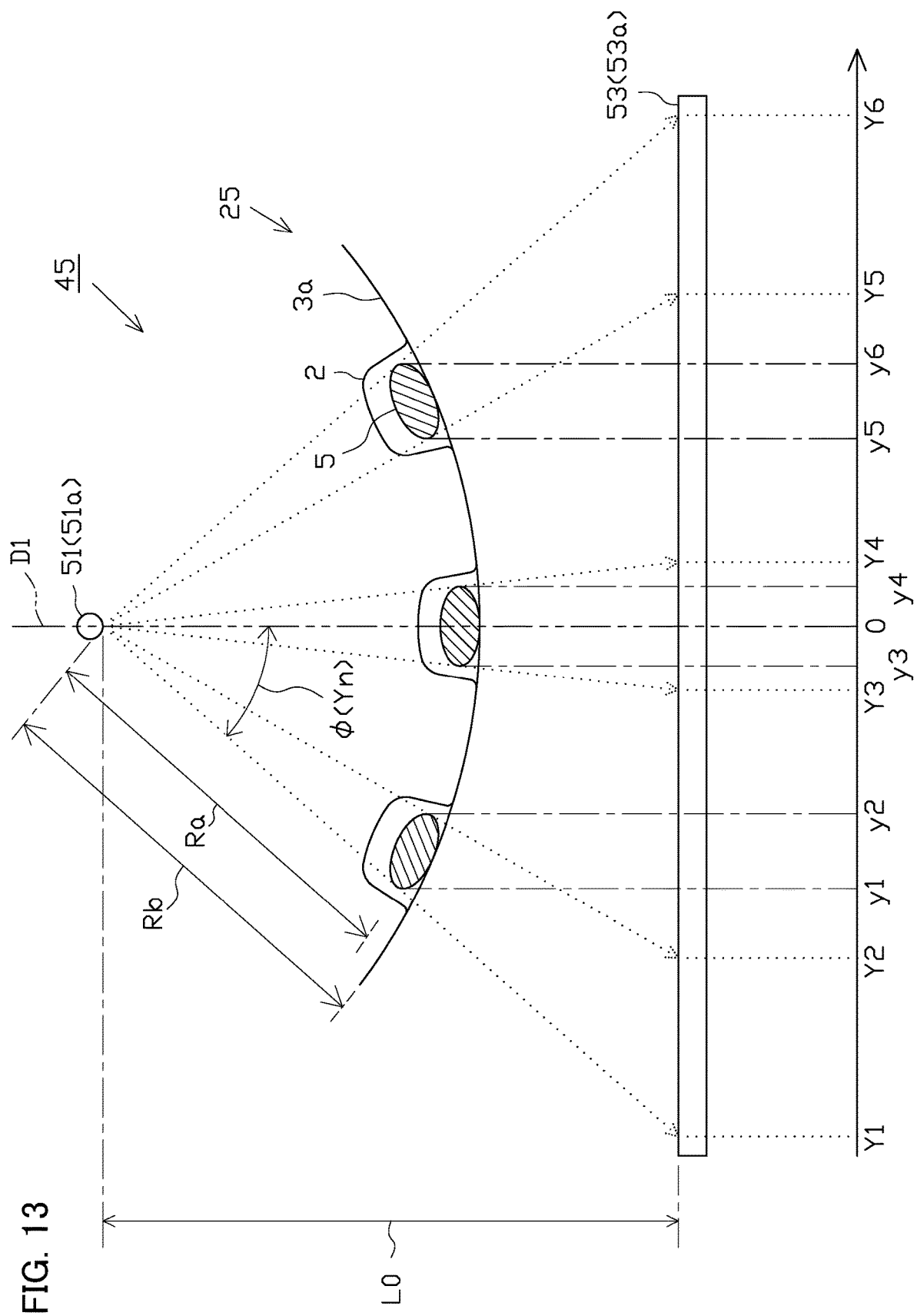

INSPECTION DEVICE, PACKAGING MACHINE, AND PACKAGE INSPECTION METHOD

BACKGROUND

Technical Field

The present invention relates to an inspection device configured to inspect a package with tablets placed therein, a packaging machine, and a package inspection method.

Description of Related Art

PTP (press through package) sheets have widely been used as sheet-type packages (packaging sheets) for packaging tablets, in the field of pharmaceutical products, food products and the like.

A PTP sheet is comprised of a container film with pocket portions formed to place tablets therein; and a cover film mounted to the container film such as to seal an opening side of the pocket portions. A tablet placed in a pocket portion is taken out by pressing the pocket portion from outside to cause the tablet placed in the pocket portion to break through the cover film serving as the cover.

This PTP sheet is manufactured through, for example, a pocket portion forming process of forming pocket portions in a container film in a belt-like form; a filling process of filling the pocket portions with tablets; a mounting process of mounting a cover film in a belt-like form to a flange portion formed around the pocket portions in the container film so as to seal an opening side of the pocket portion; and a separation process of separating a PTP sheet as a final product from a PTP film that is a belt-like package provided by mounting the respective films to each other.

In the case of manufacturing such a PTP sheet, an inspection for any abnormality of a tablet (for example, the presence or the absence of a tablet in each pocket portion or breaking or crack of a tablet), an inspection for any abnormality of a flange portion (for example, the presence or the absence of any foreign substance in the flange portion), an inspection for any abnormality of a pocket portion (for example, the presence or the absence of any foreign substance in the pocket portion) and the like are generally performed.

As a recent trend, from the standpoint of improving the light blocking effect and the moisture-proof property, both the container film and the cover film are often made of opaque materials including aluminum or the like as a base material.

In this case, the respective inspections described above are performed by using an X-ray inspection device or the like. The X-ray inspection device generally includes an X-ray generator (X-ray source) configured to irradiate a conveyed package (PTP sheet or PTP film) with X-ray and an X-ray detector configured to detect the X-ray transmitted through the package, and performs various inspections based on an X-ray transmission image obtained by the X-ray detector.

In the case of performing an X-ray inspection for a package having pocket portions formed at a plurality of positions in a width direction of the package that is perpendicular to a conveying direction of the package, the tablet placed in each of the pocket portions is enlarged to a larger size than the actual size in a projected image on the X-ray detector by the X-ray spread radially in the width direction of the package from the X-ray generator.

Furthermore, a different position of each pocket portion (tablet) in the width direction of the package provides a different incident angle of X-ray. A difference in position of each pocket portion (tablet) accordingly causes a difference in an area value or the like of the tablet on the X-ray transmission image.

With a view to suppressing reduction of the inspection accuracy, a proposed configuration of an inspection device performs good/poor quality judgment of the tablet with setting a different good/poor quality judgement reference value for each row of the pocket portions (for each position of the pocket portions in the width direction of the package) (as described in Patent Literature 1).

Patent Literature

Patent Literature 1: JP 2013-253832A

In the configuration of performing good/poor quality judgment of the tablet with setting the different good/poor quality judgment reference value for each row of the pocket portions like the above prior art configuration described in Patent Literature 1, however, there may be a difficulty in maintaining the uniformity of the inspection over an entire inspection range. For example, a tablet determined as a defective in a predetermined row of the pocket portions may be determined as a non-defective in another row of the pocket portions.

With a view to enhancing the production efficiency, a lot of recent packaging machines have been configured to set sheet punchout ranges at a plurality of positions in a width direction of a PTP film conveyed in a belt-like form and to manufacture a plurality of PTP sheets simultaneously. For example, in a PTP film 25 of the present application shown in FIG. 3, two punchout ranges Ka are set in a film width direction, and ten rows of pocket portions 2 are formed in the film width direction. The larger number of rows of the pocket portions 2 (the larger number of the pocket portions 2 in the film width direction) causes the issues described above to be more prominent and increases the time and labor required for setting the good/poor quality judgment reference values.

Moreover, with respect to an inspection for a flange portion that is continuous in the width direction of the package, it is difficult to divide the flange portion into a plurality of ranges and to set a good/poor quality judgment reference value for each of the ranges, unlike the row of the pocket portions. For example, a foreign substance that is present across two different ranges may have different judgement results, depending on selection of which of the good/poor quality judgment reference values.

The issues described above are not limited to PTP packaging but are likely to occur in the field of other packaging for packaging tablets, such as SP (strip package) packaging. These issues are also not limited to the case of using X-ray but are likely to occur in the case of using other electromagnetic waves that transmit through the package, such as terahertz electromagnetic wave.

SUMMARY

One or more embodiments of the present invention provide an inspection device that improves the inspection accuracy and the like, as well as a packaging machine and an inspection method of a package.

The following describes each of various aspects provided adequately to deal with the issues described above. Functions and advantageous effects that are characteristic of each of the aspects are also described as appropriate.

Aspect 1. There is provided an inspection device configured to inspect a package (for example, a packaging sheet or a packaging film) that is formed by mounting a first film (for example, a container film) made of an opaque material and a second film (for example, a cover film) made of an opaque film to each other and by placing a tablet in a space (for example, a pocket portion) defined between the first film and the second film. The inspection device comprises an electromagnetic wave irradiation unit (i.e., an electromagnetic wave irradiator) configured to irradiate the package that is conveyed along a predetermined direction and that has the spaces formed at a plurality of positions in a width direction perpendicular to the predetermined direction, with a predetermined electromagnetic wave (X-ray or the like) from a first film side; an imaging unit (i.e., an imaging device) located on a second film side to be opposed to the electromagnetic wave irradiation unit across the package, provided with an electromagnetic wave detection unit (i.e., an electromagnetic wave detector) (for example, a line sensor) having a plurality of detection elements that are arrayed along the width direction to detect the electromagnetic wave radiated from the electromagnetic wave irradiation unit and transmitted through the package, and configured to sequentially output an electromagnetic wave transmission image obtained every time the package is conveyed by a predetermined amount; and an image processing unit (i.e., an image processing device) configured to process an image signal output from the imaging unit. The image processing unit comprises a coordinate conversion unit (i.e., a processor) configured to convert a coordinate system of the electromagnetic wave transmission image obtained by the imaging unit into a coordinate system of the package, based on a positional relationship between the electromagnetic wave irradiation unit, the package, and the imaging unit; and an inspection unit (i.e., the processor) configured to perform an inspection for the package, based on the electromagnetic wave transmission image converted into the coordinate system of the package by the coordinate conversion unit.

The "package" described above includes a sheet-type package (a packaging sheet, for example, a "PTP sheet" or an "SP sheet") as a product and a belt-like package (a packaging film, for example, a "PTP film" or an "SP film") before the sheet-type package is separated. The same applies to the aspects described below.

The "inspection for the package" includes an "inspection with respect to the tablet", for example, the presence or the absence of a tablet in the space and breaking or crack of the tablet; an "inspection with respect to a flange portion", for example, the presence or the absence of any foreign substance in a flange portion formed around the space (a portion where the first film and the second film are mounted to each other); and an "inspection with respect to the space", for example, the presence or the absence of any foreign substance in the space.

The configuration of above aspect 1 irradiates the conveyed packages with the electromagnetic wave radiated from the electromagnetic wave irradiation unit and performs an inspection for the package, based on the electromagnetic wave transmission image obtained by taking an image of the electromagnetic wave transmitted through the package by using the imaging unit.

More specifically, the configuration of this aspect performs the process of converting the coordinate system of the electromagnetic wave transmission image obtained by the imaging unit into the coordinate system of the package, before the inspection for the package is performed. This configuration corrects the electromagnetic wave transmission image of the tablet that is enlarged and projected in a different size, depending on a difference in the position of the tablet in the width direction of the package.

This configuration accordingly enables good/poor quality judgment to be performed with respect to various inspection items (abnormality of the tablet, abnormality of the flange portion, abnormality of the space and the like), on the basis of a judgment criterion common to the entire package (the entire inspection range). In other words, this configuration enables a uniform inspection to be performed for the entire area of the package without setting a plurality of judgment criteria with respect to an identical inspection item according to the respective positions in the width direction of the package. As a result, this configuration suppresses reduction of the inspection accuracy.

Aspect 2. In the inspection device described in above aspect 1, the package may be conveyed in a state that the package is curved in an arc shape in the width direction such as to be convex to an imaging unit side, namely, protrude toward the imaging unit.

As described above, the electromagnetic wave is radiated radially from the electromagnetic wave irradiation unit. For example, in the case where the package is conveyed in a horizontal state along the width direction, the tablet at a position deviated from a width direction central area of the package is obliquely irradiated with the electromagnetic wave. The respective tablets located at different positions in the width direction of the package have different incident angles of the electromagnetic wave.

Even when each tablet is irradiated obliquely with parallel light and is projected to a predetermined imaging unit by parallel projection, the tablet may have a large projected image on the imaging unit, depending on the shape of the tablet, for example, as in the case of a tablet having a rectangular sectional shape (as shown in FIG. 14). A difference in incident angle of parallel light is also likely to cause a difference in the size of the projected image.

The configuration of above aspect 2, on the other hand, uses a predetermined guide unit or the like to curve the package in an arc shape such as to be convex to the imaging unit side. This configuration minimizes or even eliminates a difference in incident angle of the electromagnetic wave entering the tablets located at a plurality of different positions in the width direction of the package. As a result, this configuration reduces the occurrence of the issues described above.

Aspect 3. In the inspection device described in above aspect 1, the package may be a press through package (PTP) formed such that a pocket portion forming the space in the second film located on the imaging unit side is protruded toward the imaging unit side, and the package may be conveyed in a state that the package is curved in an arc shape in the width direction such as to be convex to the electromagnetic wave irradiation unit side, namely, protrude toward the electromagnetic wave irradiation unit.

The intensity of electromagnetic wave such as X-ray radiated radially from the electromagnetic wave irradiation unit attenuates in inverse proportion to the square of the distance. Additionally, a difference in incident angle of the electromagnetic wave causes a difference in inspection capability. Accordingly, the irradiation angle of electromagnetic wave is not allowed to be increased without limitation but is limited to such an angle that enables a predetermined inspection range to be irradiated substantially uniformly. As a result, it has conventionally been difficult to shorten the distance from the package to the electromagnetic wave irradiation unit and also difficult to achieve downsizing of the inspection device.

The configuration of above aspect 3, on the other hand, causes a protrusion side of the pocket portion to be located on an inner side (concave side) of the package curved in an arc shape and thereby causes the entire package to be placed in a narrower width range.

This configuration shortens the distance between the electromagnetic wave irradiation unit and the imaging unit, while keeping the entire package in an irradiation range of electromagnetic wave without increasing the irradiation angle (spread in the width direction) of the electromagnetic wave radiated from the electromagnetic wave irradiation unit to be larger than that of the conventional configuration. As a result, this achieves downsizing of the inspection device.

Additionally, shortening the distance between the electromagnetic wave irradiation unit and the imaging unit readily ensures a sufficient transmission amount of electromagnetic wave required for the inspection and improves the inspection accuracy. This also enables a lower-power, small-size device to be employed for the electromagnetic wave irradiation unit and thereby achieves further downsizing of the inspection device.

Aspect 4. In the inspection device described in any of above aspects 1 to 3, the package may be a belt-like package (for example, a PTP film) which is formed by mounting the first film in a belt-like form and the second film in a belt-like form to each other and from which a sheet-type package (for example, a PTP sheet) is separated from each of sheet cutting ranges set at two positions in the width direction. Two sheet-type packages aligned in the width direction in the belt-like package may be placed symmetrically in the width direction with respect to a width direction central area of the belt-like package that intersects with a center axis of the electromagnetic wave irradiation unit (a bisector of the incident angle) and are arranged such that tag portions of the respective sheet-type packages face the width direction central area of the belt-like package or face outward in the width direction of the belt-like package.

The "tag portion" indicates a region formed at one end in a predetermined direction of the sheet-type package (packaging sheet) to show various pieces of information, such as the name of the tablet and a lot number, provided therein by stamping, by printing or the like. Unlike a sheet main body where the spaces for placing the tablets therein are formed, no space is formed in the "tag portion".

As described above, a difference in the position of the tablet in the width direction of the belt-like package provides a different transmission amount of the electromagnetic wave transmitted through each tablet. Accordingly, in the case where the spaces (tablets) are not arranged symmetrically in the width direction of the belt-like package with respect to the width direction central area, there is a possibility that a uniform inspection cannot be performed for the two sheet-type packages aligned in the width direction of the belt-like package.

The configuration of above aspect 4, on the other hand, causes the sheet separation ranges of the two sheet-type packages to be arranged symmetrically with respect to the width direction central area of the belt-like package. This also causes the arrangement layout of the spaces included in the sheet-type packages to be symmetric in the width direction of the belt-like package.

As a result, this configuration enables the more uniform inspection to be performed for the two sheet-type packages aligned in the width direction of the belt-like package and thereby suppresses reduction of the inspection accuracy.

Aspect 5. The inspection device described in any of above aspects 1 to 4 may further comprise an intensity correction unit configured to correct a value of each pixel (electromagnetic wave intensity) of the electromagnetic wave transmission image, based on a positional relationship between the electromagnetic wave irradiation unit and the imaging unit.

As described above, the electromagnetic wave transmitted through the package on an outer side in the width direction rather than at the width direction central area of the package has the smaller transmission amount detected by the electromagnetic wave detection unit. Accordingly, the electromagnetic wave transmission image is an image having the lower electromagnetic wave intensity (the lower lightness) at a position corresponding to the outer side in the width direction than at a position corresponding to the width direction central area of the package. As a result, it may be difficult to perform a uniform inspection for the entire inspection range.

The configuration of above aspect 5, on the other hand, performs correction to obtain a corrected electromagnetic wave transmission image having the more uniform electromagnetic wave intensities over the entire inspection range and performs an inspection, based on this corrected electromagnetic wave transmission image. As a result, this configuration improves the inspection accuracy.

Aspect 6. In the inspection device described in any of above aspects 1 to 5, the coordinate conversion unit may convert the coordinate system of the electromagnetic wave transmission image obtained by the imaging unit into a coordinate system on a basis of at least the tablet and a coordinate system on a basis of a flange portion formed around the space. The inspection unit may perform an inspection for the tablet based on the electromagnetic wave transmission image converted into the coordinate system on the basis of at least the tablet and may also perform an inspection for the flange portion based on the electromagnetic wave transmission image converted into the coordinate system on the basis of the flange portion, as the inspection for the package.

The "coordinate system on the basis of the tablet" includes, for example, a "coordinate system on the basis of the position of a thickness direction central area of the tablet". The "coordinate system on the basis of the flange portion" includes, for example, a "coordinate system on the basis of the position of an exposed surface of the first film or the second film" or a "coordinate system on the basis of the position of mounting surfaces of the first film and the second film".

The configuration of above aspect 6 enables an inspection to be performed for the tablet and the flange portion, based on the electromagnetic wave transmission images respectively converted into appropriate coordinate systems. As a result, this configuration further improves the inspection accuracy.

Aspect 7. In the inspection device described in any of above aspects 1 to 6, the electromagnetic wave may be X-ray or terahertz electromagnetic wave.

Aspect 8. In the inspection device described in any of above aspects 1 to 7, the first film and the second film may be formed by using aluminum as a base material.

The film "made by using aluminum as the base material (main material) includes not only a film made of simple aluminum but an aluminum laminated film with an intervening resin film layer.

Aspect 9. There is provided a packaging machine, comprising the inspection device described in any of above aspects 1 to 8.

Like the configuration of above aspect 9, the packaging machine provided with the inspection device described in above aspect 1 or the like has advantages, for example, efficiently excluding defectives in the process of manufacturing the packaging sheet (sheet-type package). The packaging machine may also be provided with a discharge unit configured to discharge any sheet-type package determined as defective by the inspection device described above.

The packaging machine may have a configuration described below as a concrete example.

There is provided a packaging machine configured to manufacture a belt-like package by mounting a first film in a belt-like form made of an opaque material and a second film in a belt-like form made of an opaque material to each other and placing a tablet in a space defined between the first film and the second film; and to manufacture a sheet-type package by separating the belt-like package at a plurality of positions in a width direction of the belt-like package in a sheet unit. The packaging machine comprises a mounting unit configured to mount the first film conveyed in a belt-like form and the second film conveyed in a belt-like form to each other; a filling unit configured to fill the tablet in the space defined between the first film and the second film; a separation unit configured to separate the sheet-type package from the belt-like package formed by mounting the first film and the second film to each other and placing the tablet in the space (including a punchout unit configured to punch out the sheet-type package in the sheet unit); and the inspection device described in any of above aspects 1 to 8.

According to one configuration, the above inspection device (an inspection process) may be "located upstream (performed in a previous process of) the separation unit (a separation process)".

In a previous process before the sheet-type package (for example, a PTP sheet) is separated from the belt-like package (for example, a PTP film), the position and the direction of an inspection range corresponding to the sheet-type package as an inspection object are fixed relative to the electromagnetic wave irradiation unit and the imaging unit during an inspection. This configuration does not require to adjust the position and the direction of the sheet-like package prior to the inspection and ensures the easier and the higher-speed inspection. This accordingly further improves the inspection accuracy.

According to another configuration, the above inspection device (the inspection process) may be "located downstream (performed in a post process of) the separation unit (the separation process)". This configuration allows for a check for the presence of any defective in a final stage.

The packaging machine is provided with a large number of devices configured to perform processing and inspection in various processes, as well as the inspection device described above, and accordingly has a small vacant space. When the inspection device has a large size, it is thus difficult to place the inspection device in the packaging machine. On the contrary, there may be a need to increase the size of the packaging machine for the purpose of placing the large-size inspection device therein.

Providing the inspection device described in above aspect 3 or the like, however, suppresses the occurrence of such issues.

Aspect 10. There is provided an inspection method of inspecting a package (for example, a packaging sheet or a packaging film) that is formed by mounting a first film (for example, a container film) made of an opaque material and a second film (for example, a cover film) made of an opaque film to each other and by placing a tablet in a space (for example, a pocket portion) defined between the first film and the second film. The inspection method comprises an irradiation process of irradiating the package that is conveyed along a predetermined direction and that has the spaces formed at a plurality of positions in a width direction perpendicular to the predetermined direction, with a predetermined electromagnetic wave (X-ray or the like) radiated from a predetermined electromagnetic wave irradiation unit located on a first film side; an imaging process of, every time the package is conveyed by a predetermined amount, sequentially outputting an electromagnetic wave transmission image obtained by detecting electromagnetic wave transmitted through the package by using a predetermined imaging unit that is located on a second film side to be opposed to the electromagnetic wave irradiation unit across the package; a coordinate conversion process of converting a coordinate system of the electromagnetic wave transmission image obtained in the imaging process into a coordinate system of the package, based on a positional relationship between the electromagnetic wave irradiation unit, the package, and the imaging unit; and an inspection process of performing an inspection for the package, based on the electromagnetic wave transmission image converted into the coordinate system of the package in the coordinate conversion process.

The configuration of above aspect 10 has similar functions and advantageous effects to those of aspect 1 described above.

BRIEF DESCRIPTION OF DRAWINGS

FIG. 13 is a schematic diagram illustrating a positional relationship between the X-ray irradiator, the X-ray line sensor camera, and the PTP film and the principle of its coordinate conversion process according to one or more embodiments;

DETAILED DESCRIPTION OF EMBODIMENTS

The following describes embodiments of the present invention with reference to drawings. A PTP sheet 1 as packaging sheet (sheet-like package) is described first.

Figure 1:
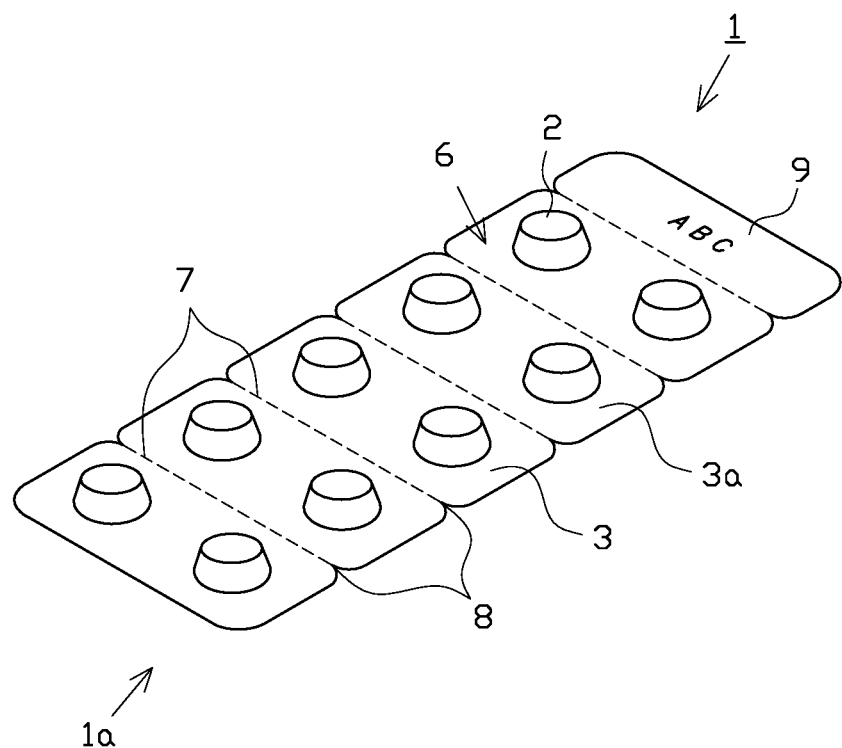
FIG. 1 is a perspective view illustrating a PTP sheet.
Figure 2:
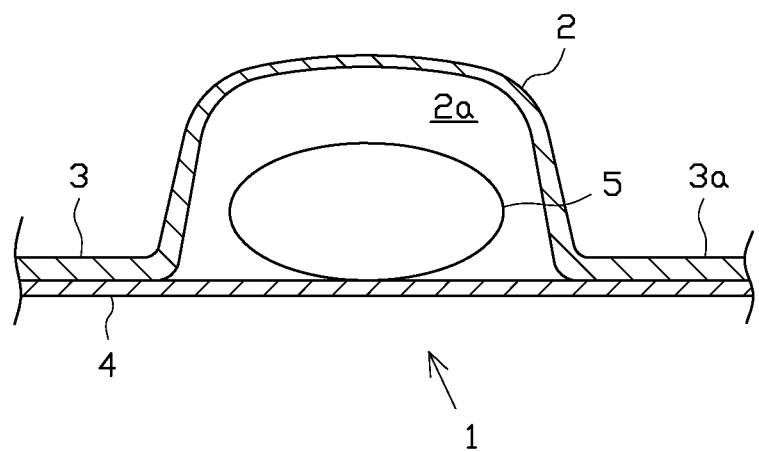
FIG. 2 is a partly enlarged sectional view illustrating the PTP sheet.

As shown in FIG. 1 and FIG. 2, the PTP sheet 1 includes a container film 3 provided with a plurality of pocket portions 2, and a cover film 4 mounted to the container film 3 such as to close the respective pocket portions 2. According to one or more embodiments, the "container film 3" is configured as the "first film", and the "cover film 4" is configured as the "second film".

The container film 3 and the cover film 4 according to one or more embodiments are composed of opaque materials that include aluminum as a base material (main material). For example, the container film 3 is made of an aluminum laminated film (an aluminum film with a synthetic resin film laminated thereon). The cover film 4 is, on the other hand, made of an aluminum film.

The PTP sheet 1 is formed in an approximately rectangular shape in plan view and has four corners in a rounded shape like an arc. In the PTP sheet 1, five pocket portion arrays are formed in a sheet longitudinal direction, and each pocket portion array includes two pocket portions 2 arranged along a sheet short side direction. Accordingly, a total of ten pocket portions 2 are formed in the PTP sheet 1.

One tablet 5 is placed in each of spaces 2a inside the respective pocket portions 2. The tablet 5 according to one or more embodiments is an uncoated tablet in a circular shape in plan view (what is called a lens-shaped tablet) having a surface curved from a center portion toward a peripheral portion and having different thicknesses in the center portion and in the peripheral portion. The type of the tablet 5 is, however, not limited to the lens-shaped tablet. The tablet 5 may be, for example, a disk-shaped flat tablet (cylindrical tablet) or a triangular or a rectangular tablet in a non-circular shape in plan view.

The PTP sheet 1 also includes a plurality of perforations 7 formed along the sheet short side direction as separation lines that enable the PTP sheet 1 to be separated in the unit of small sheet pieces 6, each unit including a predetermined number of (two according to one or more embodiments) the pocket portions 2.

The PTP sheet 1 further includes constricted portions 8 formed corresponding to the positions where the perforations 7 are formed. This configuration causes four corners of each of the small sheet pieces 6 to have a rounded shape like an arc when the PTP sheet 1 is separated in the unit of the small sheet pieces 6.

The PTP sheet 1 additionally includes a tag portion 9 provided at one end in the sheet longitudinal direction to show various pieces of information such as the name of the tablet and a lot number (a letter string "ABC" according to one or more embodiments) stamped therein. The tag portion 9 is not provided with the pocket portions 2 but is parted from a sheet main body 1a consisting of the five small sheet pieces 6 by one perforation 7.

The PTP sheet 1 of one or more embodiments (shown in FIG. 1) is manufactured through, for example, a process of punching out a rectangular sheet that is the PTP sheet 1 as a final product from a belt-like PTP film 25 (shown in FIG. 3) obtained by mounting a belt-like cover film 4 to a belt-like container film 3. In the description below, a "width direction of the PTP film 25 (a vertical direction in FIG. 3)" is referred to as "film width direction", and a "conveying direction of the PTP film 25 (a horizontal direction in FIG. 3)" is referred to as "film conveying direction".

Figure 3:
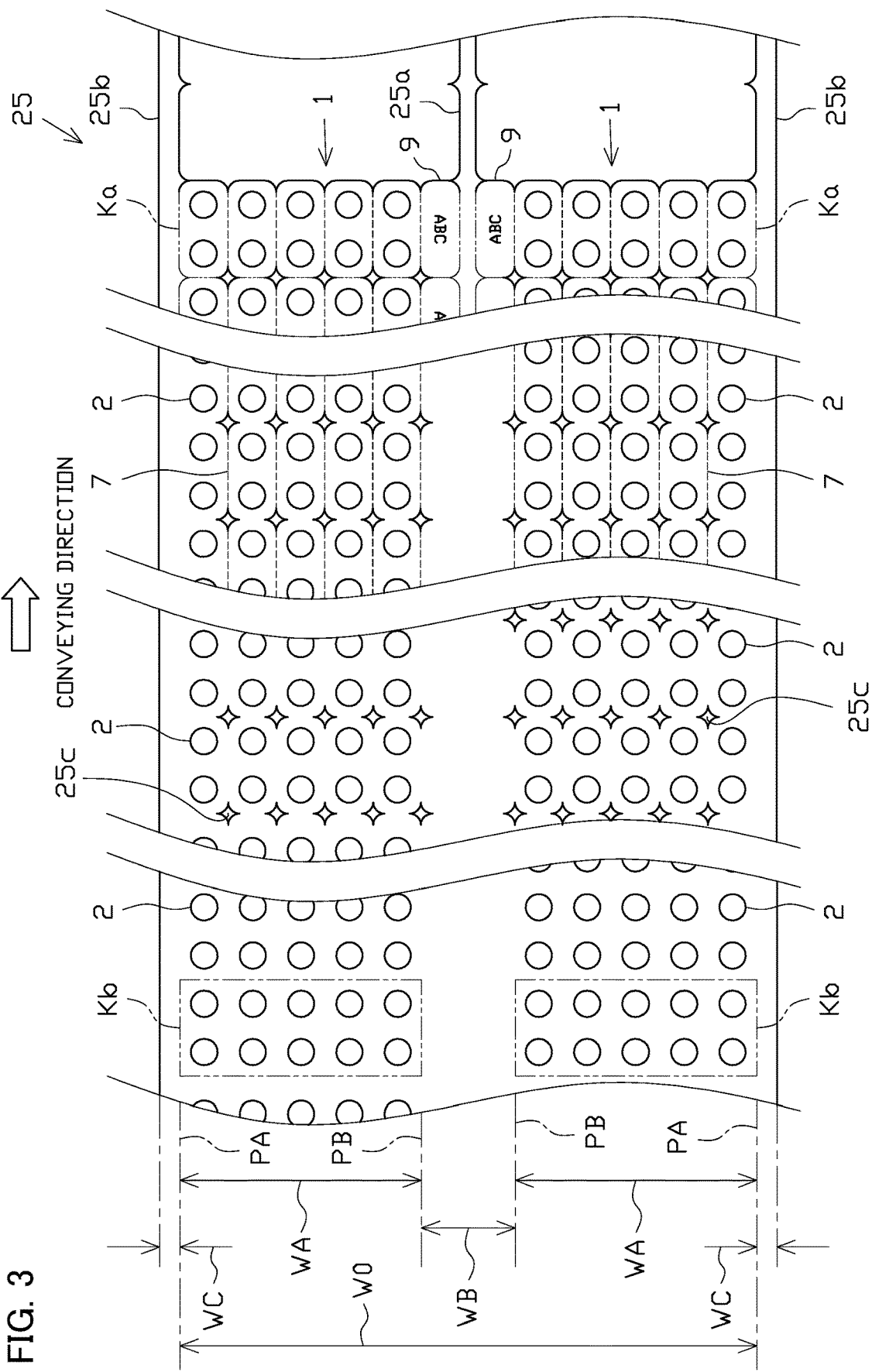
FIG. 3 is a schematic configuration diagram illustrating a layout of a PTP film.

As shown in FIG. 3, the PTP film 25 according to one or more embodiments is configured in such a layout that two punch-out ranges Ka for the PTP sheets 1 (hereinafter simply referred to as "sheet punch-out ranges Ka") are arrayed in the film width direction, that a center scrap 25a extended in a belt-like form along the film conveying direction connects the two sheet punch-out ranges Ka arrayed to be adjacent to each other, that side scraps 25b extended in a belt-like form along the film conveying direction connect respective ends in the film width direction, and a plurality of astroid scraps 25c are arranged on boundary lines between the two sheet punch-out ranges Ka adjacent to each other in the film conveying direction to form the constricted portions 8 described above. In FIG. 3, for the purpose of simplifying the illustration and making the astroid scraps 25c readily understandable, holes formed by punching out the astroid scraps 25c are indicated as the astroid scraps 25c with lead lines.

The PTP sheets 1 punched out from the two sheet punch-out ranges Ka arrayed in the film width direction in the PTP film 25 have the tag portions 9 that respectively face a film width direction central area and that are adjacent to the center scrap 25a. The sheet punch-out range Ka corresponds to the "sheet separation range" according to one or more embodiments.

The following describes the schematic configuration of a PTP packaging machine 10 configured to manufacture the PTP sheet 1 described above, with reference to FIG. 4.

Figure 4:
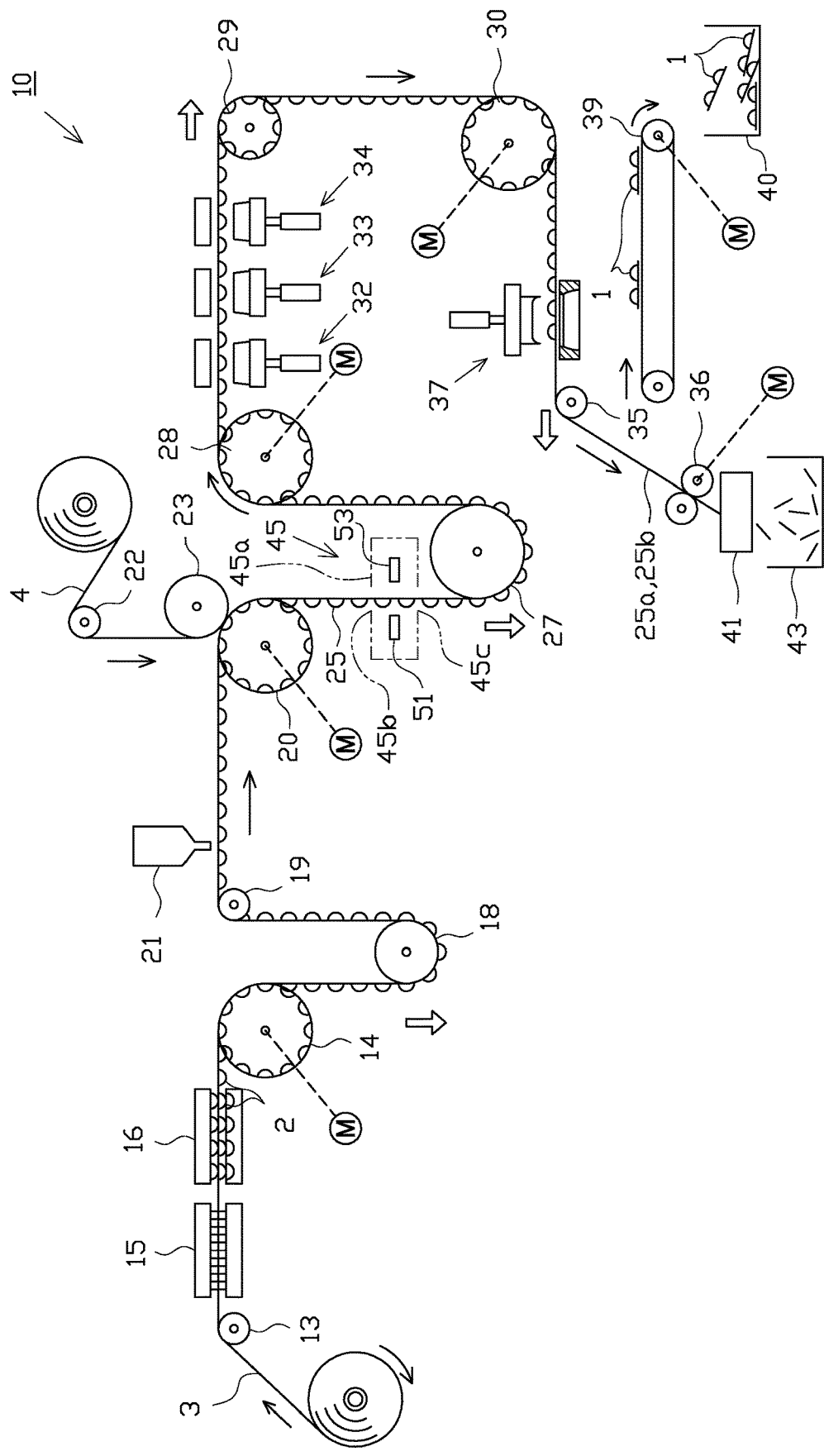
FIG. 4 is a schematic configuration diagram illustrating a PTP packaging machine.

As shown in FIG. 4, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A pocket portion forming device 16 serving as the pocket portion forming unit is placed along the conveyance path of the container film 3 between the guide roll 13 and the intermittent feed roll 14. This pocket portion forming device 16 forms a plurality of the pocket portions 2 simultaneously at predetermined positions in the container film 3 by cold working (pocket portion forming process). Formation of the pocket portions 2 is performed during an interval between conveying operations of the container film 3 by the intermittent feed roll 14.

The PTP packaging machine 10 according to one or more embodiments is a packaging machine (multi-use machine) configured to use not only aluminum but a thermoplastic resin material that is relatively hard and that has a predetermined rigidity, such as PP (polypropylene) or PVC (polyvinyl chloride), to manufacture the container film 3. Accordingly, the PTP packaging machine 10 is provided with a heating device 15 placed on an upstream side of the pocket portion forming device 16 to heat the container film 3 and make the container film 3 soft. The heating device 15 is naturally not used when the container film 3 is formed from aluminum.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 serving as the filling unit is placed along the conveyance path of the container film 3 between the guide roll 19 and the film receiving roll 20.

The tablet filling device 21 serves to automatically fill the pocket portions 2 with the tablets 5. The tablet filling device 21 opens a shutter at every predetermined time interval to drop the tablet 5, in synchronization with the conveying operation of the container film 3 by the film receiving roll 20. Each of the pocket portions 2 is filled with the tablet 5 by this shutter opening operation (filling process).

A film roll of the cover film 4 formed in the belt-like shape is also wound in a roll form on a most upstream side. A pullout end of the cover film 4 wound in the roll form is guided by a guide roll 22 to a heating roll 23. The heating roll 23 is pressed against to be in contact with the film receiving roll 20. The container film 3 and the cover film 4 are accordingly fed into between the two rolls 20 and 23.

The container film 3 and the cover film 4 pass through between the two rolls 20 and 23 in the heated and pressed contact state, so that the cover film 4 is mounted to a flange portion 3a (shown in FIGS. 1 and 2) around the pocket portions 2 of the container film 3 such as to close the respective pocket portions 2 with the cover film 4 (mounting process).

This series of operations manufactures the PTP film 25 that is a belt-like package having the pocket portions 2 respectively filled with the tablets 5. The heating roll 23 has minute protrusions formed on the surface of the heating roll 23 in a net-like pattern for sealing. Strongly pressing these protrusions against the films provides secure sealing. The film receiving roll 20 and the heating roll 23 are configured as the mounting unit according to one or more embodiments.

The film receiving roll 20 is provided with a non-illustrated encoder configured to output a predetermined timing signal to an X-ray inspection device 45 described later every time the film receiving roll 20 is rotated by a predetermined amount or in other words, every time the PTP film 25 is conveyed by a predetermined amount.

The PTP film 25 fed from the film receiving roll 20 is sequentially laid on a tension roll 27 and an intermittent feed roll 28 in this order.

The intermittent feed roll 28 is linked with a motor rotating in an intermittent manner, so as to convey the PTP film 25 intermittently. The tension roll 27 is configured to pull the PTP film 25 in a direction of applying tension by an elastic force. This configuration prevents a slack of the PTP film 25 due to a difference between the conveying operation by the film receiving roll 20 and the conveying operation by the intermittent feed roll 28 and constantly keeps the PTP film 25 in the state of tension.

The X-ray inspection device 45 is placed along the conveyance path of the PTP film 25 between the film receiving roll 20 and the tension roll 27. The X-ray inspection device 45 is configured to perform X-ray inspection mainly for the purpose of detection of any abnormality of the tablet 5 (for example, the presence or the absence of the tablet 5, breaking or crack of the tablet 5) placed in the pocket portion 2 or any abnormality of the flange portion 3a (for example, any foreign substance present on the flange 3a) other than the pocket portions 2. The inspection items are, however, not limited to these items, but the inspection may be performed for other inspection items. For example, a modification may be configured to perform an inspection for any abnormality of the pocket portion 2 (for example, the presence or the absence of any foreign substance in the pocket portion 2).

The PTP film 25 fed from the intermittent feed roll 28 is sequentially laid on a tension roll 29 and an intermittent feed roll 30 in this order. The intermittent feed roll 30 is linked with a motor rotating in an intermittent manner, so as to convey the PTP film 25 intermittently. The tension roll 29 is configured to pull the PTP film 25 in a direction of applying tension by an elastic force and thereby serves to prevent a slack of the PTP film 25 between these intermittent feed rolls 28 and 30.

A scrap punching device 32, a perforation forming device 33, and a stamping device 34 are sequentially placed along the conveyance path of the PTP film 25 between the intermittent feed roll 28 and the tension roll 29.

The scrap punching device 32 serves to punch out the astroid scraps 25c described above from predetermined positions of the PTP film 25. The perforation forming device 33 serves to form the perforations 7 described above at predetermined positions of the PTP film 25. The stamping device 34 serves to stamp the mark "ABC" described above at predetermined positions of the PTP film 25 (positions corresponding to the tag portions 9 described above).

The PTP film 25 fed from the intermittent feed roll 30 is sequentially laid on a tension roll 35 and a continuous feed roll 36 in this order, downstream of the intermittent feed roll 30. A sheet punching device 37 is placed along the conveyance path of the PTP film 25 between the intermittent feed roll 30 and the tension roll 35. The sheet punching device 37 serves as the sheet punchout unit (separation unit) to punch out the outer periphery of each unit of PTP sheet 1 from the PTP film 25.

The respective PTP sheets 1 punched out by the sheet punching device 37 are conveyed by a conveyor 39 and are temporarily accumulated in a finished product hopper 40 (separation process). When a PTP sheet 1 is determined as a defective by the X-ray inspection device 45 described above, however, the PTP sheet 1 determined as the defective is not conveyed to the finished product hopper 40 but is separately discharged by a non-illustrated defective sheet discharge mechanism serving as the discharge unit and is transferred to a non-illustrated defective hopper.

A cutting device 41 is provided downstream of the continuous feed roll 36. Wastes (scraps 25a and 25b) remaining in a belt-like form after the punch-out by the sheet punching device 37 are guided by the tension roll 35 and the continuous feed roll 36 and are then led to the cutting device 41. A driven roll is pressed against to be in contact with the continuous feed roll 36, so that the scraps 25a and 25b are placed and conveyed between the driven roll and the continuous feed roll 36.

The cutting device 41 serves to cut the scraps 25a and 25b into predetermined dimensions. The cut pieces of the scraps 25a and 25b are accumulated in a scrap hopper 43 and are then disposed separately.

Each of the rolls, such as the rolls 14, 19, 20, 28, 29 and 30, described above is arranged in such a positional relationship that the roll surface is opposed to the pocket portions 2. The surface of each roll, such as the surface of the roll 14, has recesses that are formed to place the pocket portions 2 therein. This configuration suppresses the pocket portions 2 from being crushed. The feeding operation with the pocket portions 2 placed in the respective recesses of each roll, such as the roll 14, achieves the reliable intermittent feed and continuous feed.

Figure 5:
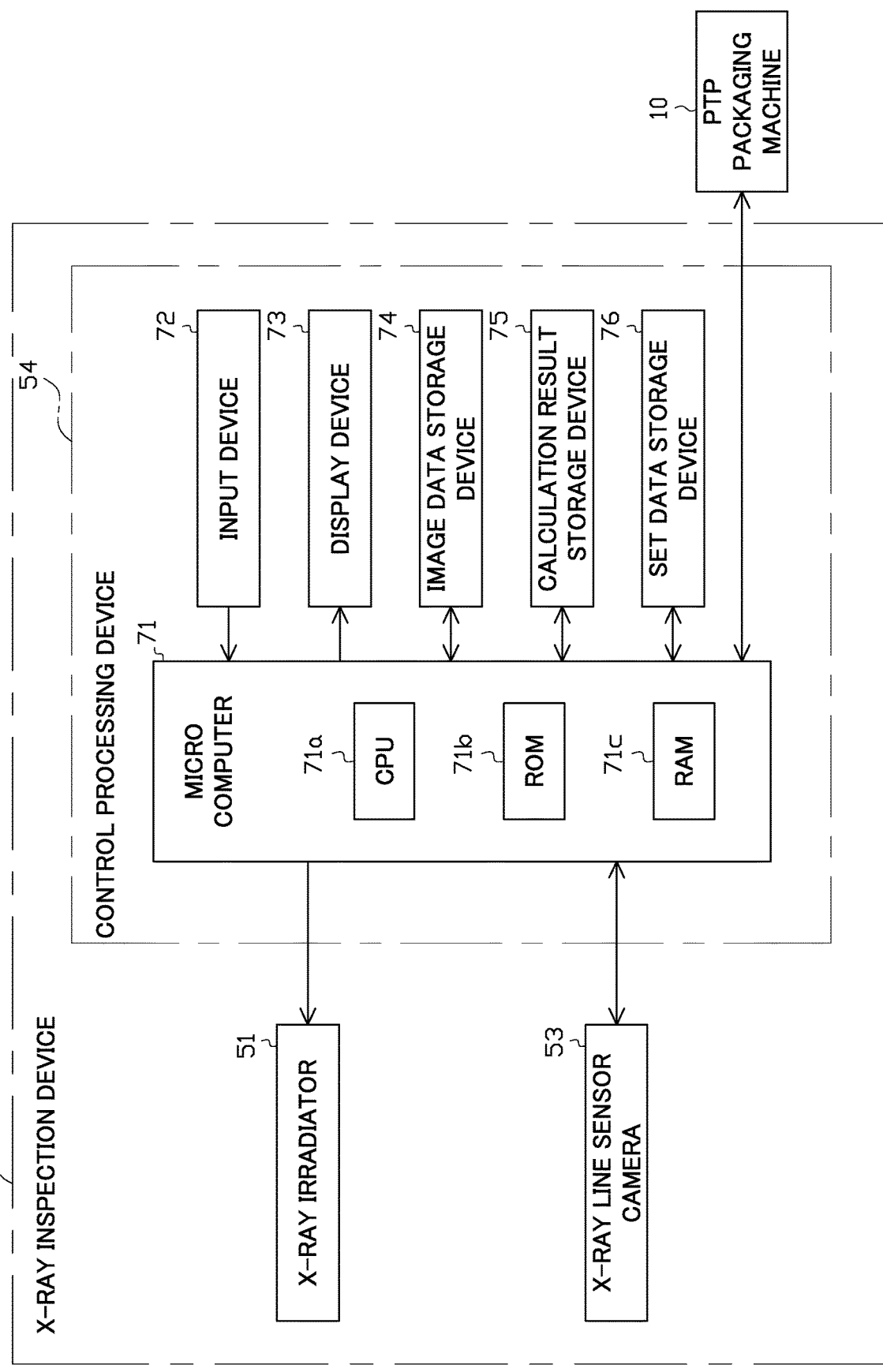
FIG. 5 is a block diagram illustrating the electrical configuration of an X-ray inspection device.
Figure 6:
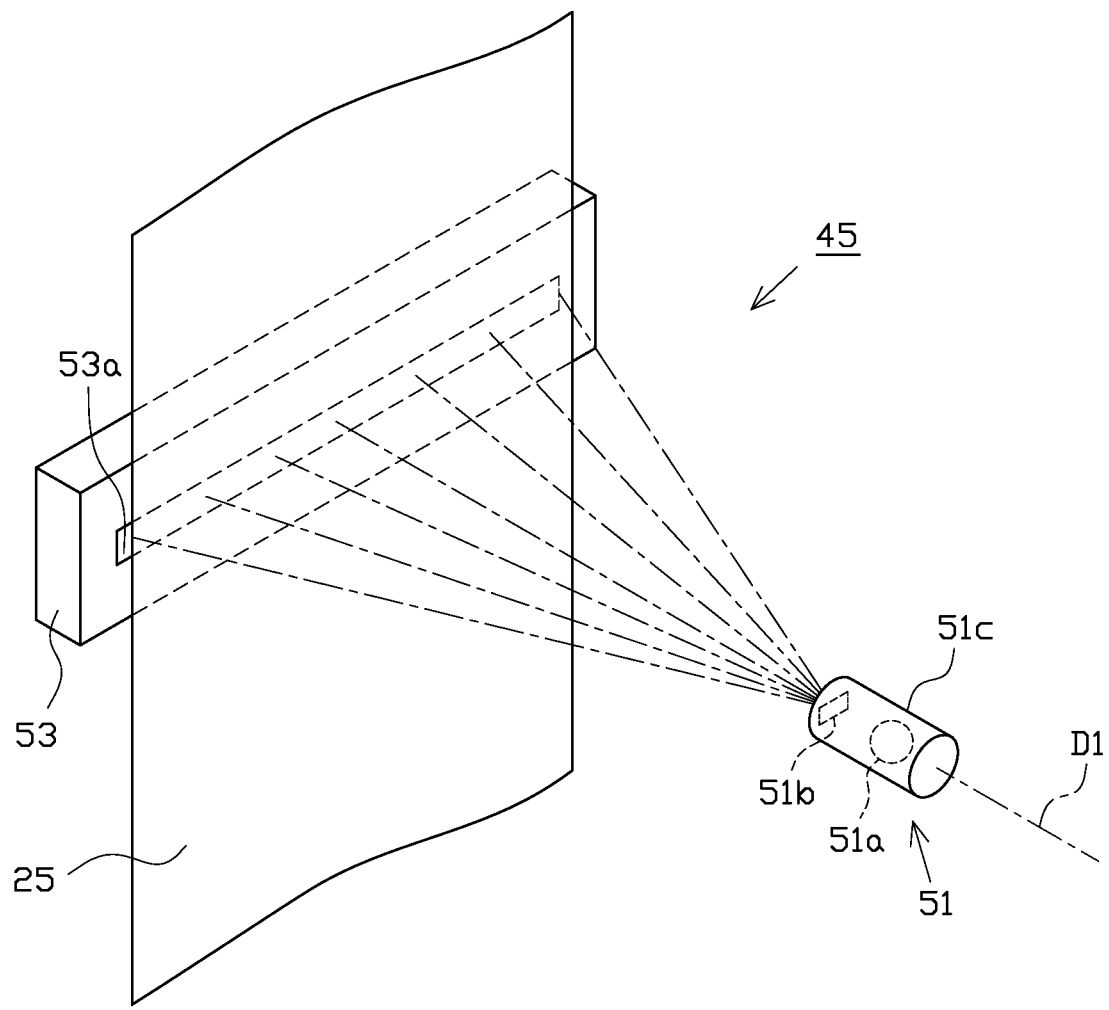
FIG. 6 is a perspective view schematically illustrating the general configuration of the X-ray inspection device.

The foregoing describes the outline of the PTP packaging machine 10. The following describes the configuration of the above X-ray inspection device 45 in detail with reference to drawings. FIG. 5 is a block diagram illustrating the electrical configuration of the X-ray inspection device 45. FIG. 6 is a perspective view schematically illustrating the schematic configuration of the X-ray inspection device 45. For the purpose of simplicity, part of the configuration, for example, the pocket portions 2 of the PTP film 25, is omitted from the illustration of FIG. 6.

As shown in FIGS. 5 and 6, the X-ray inspection device 45 includes an X-ray irradiator 51 configured to irradiate the PTP film 25 with X-ray; an X-ray line sensor camera 53 configured to take an X-ray transmission image of the PTP film 25 irradiated with the X-ray; and a control processing device 54 configured to perform various controls in the X-ray inspection device 45, such as drive controls of the X-ray irradiator 51 and the X-ray line sensor camera 53, image processing, arithmetic operations and the like.

According to one or more embodiments, the "X ray" corresponds to the "electromagnetic wave". Accordingly, the "X-ray transmission image (data)" configures the "electromagnetic wave transmission image (data)"; the "control processing device 54" configures the "image processing unit"; the "X-ray irradiator 51 configures the "electromagnetic wave irradiation unit"; and the "X-ray line sensor camera 53" configures the "imaging unit".

The X-ray irradiator 51 and the X-ray line sensor camera 53 are placed in a shield box 45a made of a material that is capable of shielding the X-ray (as shown in FIG. 4). The shield box 45a is provided with a slit-like inlet 45b, a slit-like outlet 45c and the like to allow the PTP film 25 to pass through and otherwise has a structure that minimizes leakage of the X-ray to the outside.

The X-ray irradiator 51 is arranged on one side in a normal direction of the PTP film 25 (on the container film 3-side according to one or more embodiments) that is conveyed with facing downward in the vertical direction. In the description below, the "normal direction of the PTP film 25" is referred to as the "film normal direction".

The X-ray irradiator 51 includes an X-ray source 51a configured to emit X-ray; and a collimator 51b configured to concentrate the X-ray emitted from the X-ray source 51a, and is configured such that these components are placed in a shielding container 51c made of a material that is capable of shielding the X-ray. The X-ray emitted from the X-ray source 51a is radiated outside via an opening (not shown) provided in the shielding container 51c.

The X-ray irradiator 51 is known in the art, so that the detailed description of the respective components such as the X-ray source 51a is omitted. For example, the X-ray source 51a is configured to cause electrons accelerated by a high voltage to hit against an anodic target and thereby cause X-ray to radiate in a cone shape having the target as an apex. Another configuration may, however, be employed to generate X-ray by a different technique from this technique.

Under such configuration, the X-ray irradiator 51 is configured to irradiate the PTP film 25 with X-ray in a fan beam shape having a predetermined spread in the film width direction (fan angle) by causing the collimator 51b to minimize a spread of the X-ray, which is radiated in the cone shape from the X-ray source 51a, in the film conveying direction (cone angle). The X-ray irradiator 51 may also be configured to further irradiate the PTP film 25 with X-ray in a cone beam shape having a predetermined spread in the film conveying direction.

The X-ray irradiator 51 is arranged such that its own center axis D1 (a bisector of the fan angle) is made parallel to the film normal direction of the PTP film 25.

The X-ray line sensor camera 53 is placed on an opposite side to the X-ray irradiator 51 (on the cover film 4-side according to one or more embodiments) across the PTP film 25, such as to be opposed to the X-ray irradiator 51 in the film normal direction.

The X-ray line sensor camera 53 includes an X-ray line sensor 53a configured by arraying a plurality of X-ray detection elements, which are capable of detecting the X-ray transmitted through the PTP film 25, in a line along the film width direction to serve as the electromagnetic wave detection unit, and is configured to take an image of (to be exposed to) the X-ray transmitted through the PTP film 25. The X-ray detection element may be, for example, a CCD (charge coupled device) having a light conversion layer by a scintillator.

X-ray transmission image data obtained by the X-ray line sensor camera 53 is converted into a digital signal (image signal) inside of the camera 53 and is output in the form of the digital signal to the control processing device 54 (image data storage device 74), every time the PTP film 25 is conveyed by a predetermined amount. The control processing device 54 then performs various inspections described later, for example, by performing image processing of the X-ray transmission image data.

Figure 7:
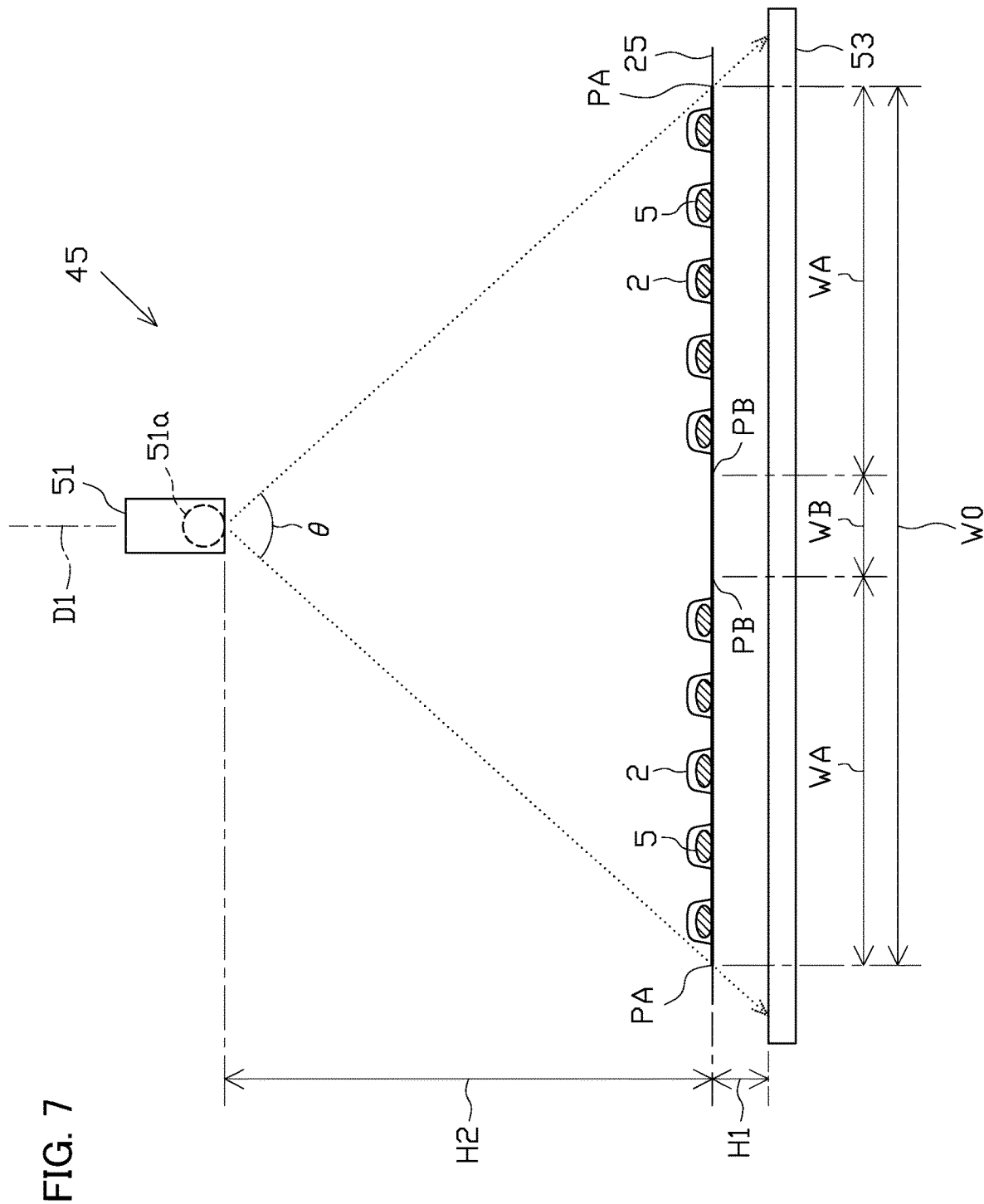
FIG. 7 is a schematic diagram illustrating a positional relationship between an X-ray irradiator, an X-ray line sensor camera, and a PTP film.

A positional relationship between the X-ray irradiator 51, the X-ray line sensor camera 53 and the PTP film 25 is described in detail with reference to FIGS. 3 and 7. The following first describes an "inspection area" on the PTP film 25 that is subjected to an inspection by the X-ray inspection device 45 and a "non-inspection area (inspection-free area)" that is not subjected to the inspection.

According to one or more embodiments, in an area corresponding to the PTP sheet 1 (sheet punchout range Ka), an area corresponding to the sheet main body 1a that consists of the five small sheet pieces 6 excluding an area corresponding to the tag portion 9 is set as an inspection area Kb with respect to one PTP sheet 1.

Accordingly, a film width direction predetermined range WA corresponding to the inspection area Kb described above (the sheet main body 1a of the PTP sheet 1) in the PTP film 25, or more specifically, the film width direction predetermined range WA from an outer-side boundary PA that is a boundary between the side scrap 25b and an area corresponding to the PTP sheet 1 adjacent to the side scrap 25b to a center-side boundary PB that is a boundary between an area corresponding to the tag portion 9 and an area corresponding to the small sheet piece 6 adjacent to this area indicates a film width direction inspection range (hereinafter simply referred to as "inspection range").

In other words, in the PTP film 25, an area corresponding to the center scrap 25a and the two tag portions 9 adjacent to the center scrap 25a and areas corresponding to the side scraps 25b are "non-inspection areas (inspection-free areas)".

Accordingly, in the PTP film 25, a center-portion predetermined range WB in the film width direction including the area corresponding to the center scrap 25a and the two tag portions 9 adjacent to the center scrap 25a and side-portion predetermined ranges WC in the film width direction corresponding to the side scraps 25b are "non-inspection ranges (inspection-free ranges)".

According to one or more embodiments, a range including the center-portion predetermined range WB and two inspection areas Kb adjacent to the center-portion predetermined range WB in the film width direction of the PTP film 25, i.e., a film width direction predetermined range WO from the outer-side boundary PA on one side in the film width direction to the outer-side boundary PA on the other side in the film width direction, is set as a film width direction X-ray irradiation range (hereinafter simply referred to as the "X-ray irradiation range").

Under such configuration, the X-ray line sensor camera 53 is arranged with a predetermined distance H1 away from the PTP film 25 in the film normal direction, and the X-ray irradiator 51 (the X-ray source 51a) is arranged with a predetermined distance H2 away from the PTP film 25 in the film normal direction. Furthermore, an irradiation angle (fan angle) of the X-ray radiated from the X-ray irradiator 51 (the X-ray source 51a) is set to a predetermined angle θ.

According to one or more embodiments, the position of the center axis D1 of the X-ray irradiator 51 in the film width direction is set at a center position in the film width direction of the PTP film 25.

The following describes the control processing device 54 with reference to FIG. 5. The control processing device 54 includes a microcomputer 71 (i.e., a processor) that is configured to control the entire X-ray inspection device 45; an input device 72 that is configured as the "input unit" by a keyboard and a mouse, a touch panel or the like; a display device 73 that is configured as the "display unit" having a display screen such as a CRT or a liquid crystal screen; an image data storage device 74 that is configured to store various image data and the like; a calculation result storage device 75 that is configured to store results of various arithmetic operations and the like; and a set data storage device 76 that is configured to store various pieces of information in advance. These devices 72 to 76 are electrically connected with the microcomputer 71.

The microcomputer 71 includes, for example, a CPU 71a serving as the operation unit, a ROM 71b configured to store various programs, and a RAM 71c configured to temporarily store a variety of data, for example, operation data and input/output data. The microcomputer 71 is configured to perform various controls in the control processing device 54 and is connected to send and receive various signals to and from the PTP packaging machine 10. The microcomputer 71 configures the image processing unit according to one or more embodiments.

Under such configuration, the microcomputer 71 drives and controls, for example, the X-ray irradiator 51 and the X-ray line sensor camera 53 to perform, for example, an imaging process of taking X-ray transmission image data with respect to the PTP film 25, an inspection process of inspecting the PTP sheet 1 based on the X-ray transmission image data, and an output process of outputting an inspection result of the inspection process to the defective sheet discharge mechanism of the PTP packaging machine 10 or the like.

The image data storage device 74 is configured to store various image data, such as the X-ray transmission image data obtained by the X-ray line sensor camera 53, as well as corrective image data obtained by a correction process, binarized image data obtained by a binarization process, and masking image data obtained by a masking process during an inspection.

The calculation result storage device 75 is configured to store inspection result data and statistical data obtained by statistically processing the inspection result data. These inspection result data and statistical data may be displayed appropriately on the display device 73.

The set data storage device 76 is configured to store various pieces of information used for inspection. These various pieces of information set and stored include, for example, the shapes and the dimensions of the PTP sheet 1, the pocket portion 2, and the tablet 5, the shape and the dimensions of a sheet frame used to define the inspection area Kb described above, the shape and the dimensions of a pocket frame used to define the area of the pocket portion 2, a luminance threshold value in the binarization process, and judgment criterion values used in various good/poor quality judgments.

The following describes an X-ray inspection (inspection method) performed by the X-ray inspection device 45. The flow of a process of obtaining the X-ray transmission image data is described first in detail.

The continuously conveyed PTP film 25 is carried into the X-ray inspection device 45 via the inlet 45b of the shield box 45a and is carried out of the X-ray inspection device 45 via the outlet 45c.

In the meantime, the microcomputer 71 drives and controls the X-ray irradiator 51 and the X-ray line sensor camera 53 to irradiate the continuously conveyed PTP film 25 with X-ray (irradiation process) and to image the X-ray transmitted through the PTP film 25 and take one-dimensional X-ray transmission image data (imaging process) every time the PTP film 25 is conveyed by a predetermined amount.

The X-ray transmission image data obtained in this manner by the X-ray line sensor camera 53 is converted into a digital signal inside of the camera 53 and is output in the form of the digital signal to the control processing device 54 (the image data storage device 74).

More specifically, when a timing signal is input from the encoder described above in the state that the PTP film 25 is continuously irradiated with the X-ray from the X-ray irradiator 51, the microcomputer 71 starts an exposure process by the X-ray line sensor camera 53.

In response to input of a next timing signal, the microcomputer 71 collectively transfers electric charges accumulated in a light receiving portion such as a photo diode to a shift register. The electric charges transferred to the shift register are then sequentially output as image signals (X-ray transmission image data) in response to a transfer clock signal, before input of a next timing signal.

Accordingly, a time period from input of a predetermined timing signal from the above encoder to input of a next timing signal is an exposure time in the X-ray line sensor camera 53.

One or more embodiments are configured such that the X-ray transmission image data is obtained by the X-ray line sensor camera 53 every time the PTP film 25 is conveyed by a width of the X-ray line sensor 53a in the film conveying direction, i.e., by a length corresponding to the width of one CCD. Another configuration different from this configuration may, however, be employed.

The image data storage device 74 sequentially stores the X-ray transmission image data input from the X-ray line sensor camera 53 in time series.

Every time the PTP film 25 is conveyed by a predetermined amount, the series of processing described above is repeatedly performed, and the position irradiated with X-ray is relatively moved. The X-ray transmission image data with respect to the two inspection ranges WA in the PTP film 25 are sequentially stored in time series with position information in the film conveying direction and in the film width direction, into the image data storage device 74. This causes two-dimensional X-ray transmission image data with respect to the sheet main body 1a (the inspection area Kb) of the PTP sheet 1 to be sequentially generated.

When the X-ray transmission image data with respect to the sheet main body 1a (the inspection area Kb) of one PTP sheet 1 as a product is obtained in this manner, the microcomputer 71 performs an inspection process (inspection routine).

Figure 8:
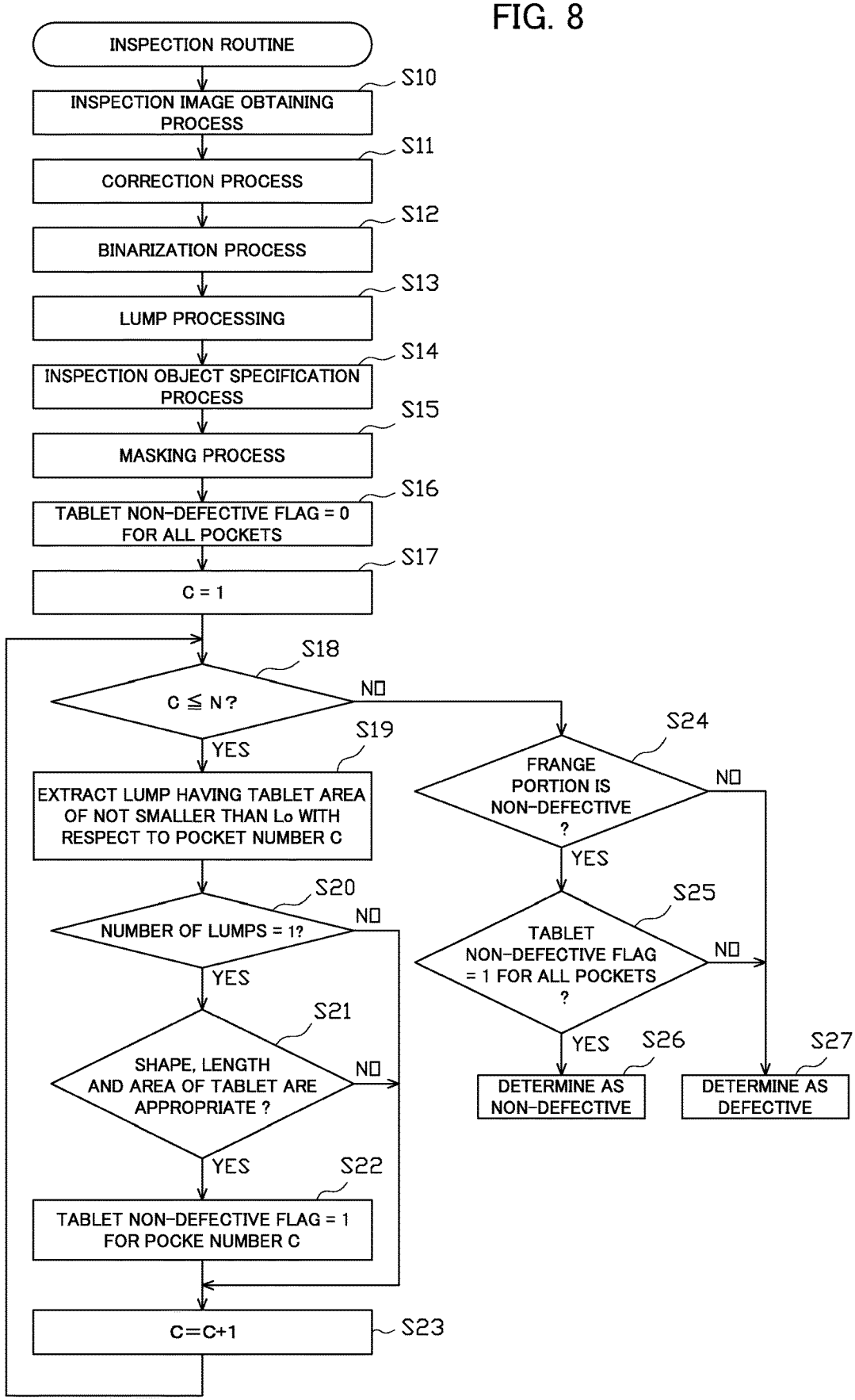
FIG. 8 is a flowchart showing an inspection routine.

The following describes the inspection routine performed by the microcomputer 71 in detail with reference to the flowchart of FIG. 8.

The inspection routine shown in FIG. 8 is performed with respect to the sheet main body 1a (the inspection area Kb) of each PTP sheet 1 as the product. More specifically, the inspection routine shown in FIG. 8 is performed for X-ray transmission image data with respect to the two PTP sheets (the sheet main bodies 1a) obtained from the two inspection ranges WA aligned in the film width direction, every time the PTP film 25 is conveyed by a length corresponding to one PTP sheet 1 in the film conveying direction.

When the X-ray transmission image data is obtained with respect to the two PTP sheets 1 (the sheet main bodies 1a) as described above, the microcomputer 71 first performs an inspection image obtaining process at step S10.

More specifically, out of the X-ray transmission image data with respect to the sheet main bodies 1a (the inspection areas Kb) of the two PTP sheets 1 obtained from the two inspection ranges WA aligned in the film width direction of the PTP film 25, the microcomputer 71 reads X-ray transmission image data with respect to the sheet main body 1a (inspection area Kb) of one PTP sheet 1, which is subjected to an inspection in this cycle of the routine, as an inspection image from the image data storage device 74.

The microcomputer 71 subsequently performs a correction process at step S11. Specifically, the microcomputer 71 corrects the X-ray transmission image data obtained as the inspection image at step S10 as described above to generate corrective image data for tablet inspection and corrective image data for flange portion inspection, and stores these corrective image data into the image data storage device 74.

More specifically, according to one or more embodiments, the microcomputer 71 performs a coordinate conversion process of converting the coordinate system of the X-ray transmission image data obtained as the inspection image into a coordinate system on the PTP film 25 (coordinate conversion process) and an intensity correction process of correcting the luminance values (X-ray intensities) of the respective pixels in the X-ray transmission image data. The function of the microcomputer 71 to perform the "coordinate conversion process" configures the "coordinate conversion unit" according to one or more embodiments. The function of the microcomputer 71 to perform the "intensity correction process" configures the "intensity correction unit" according to one or more embodiments.

One or more embodiments are configured to individually perform the coordinate conversion process and the intensity correction process for generating the corrective image data for tablet inspection and perform the coordinate conversion process and the intensity correction process for generating the corrective image data for flange portion inspection.

Figure 9:
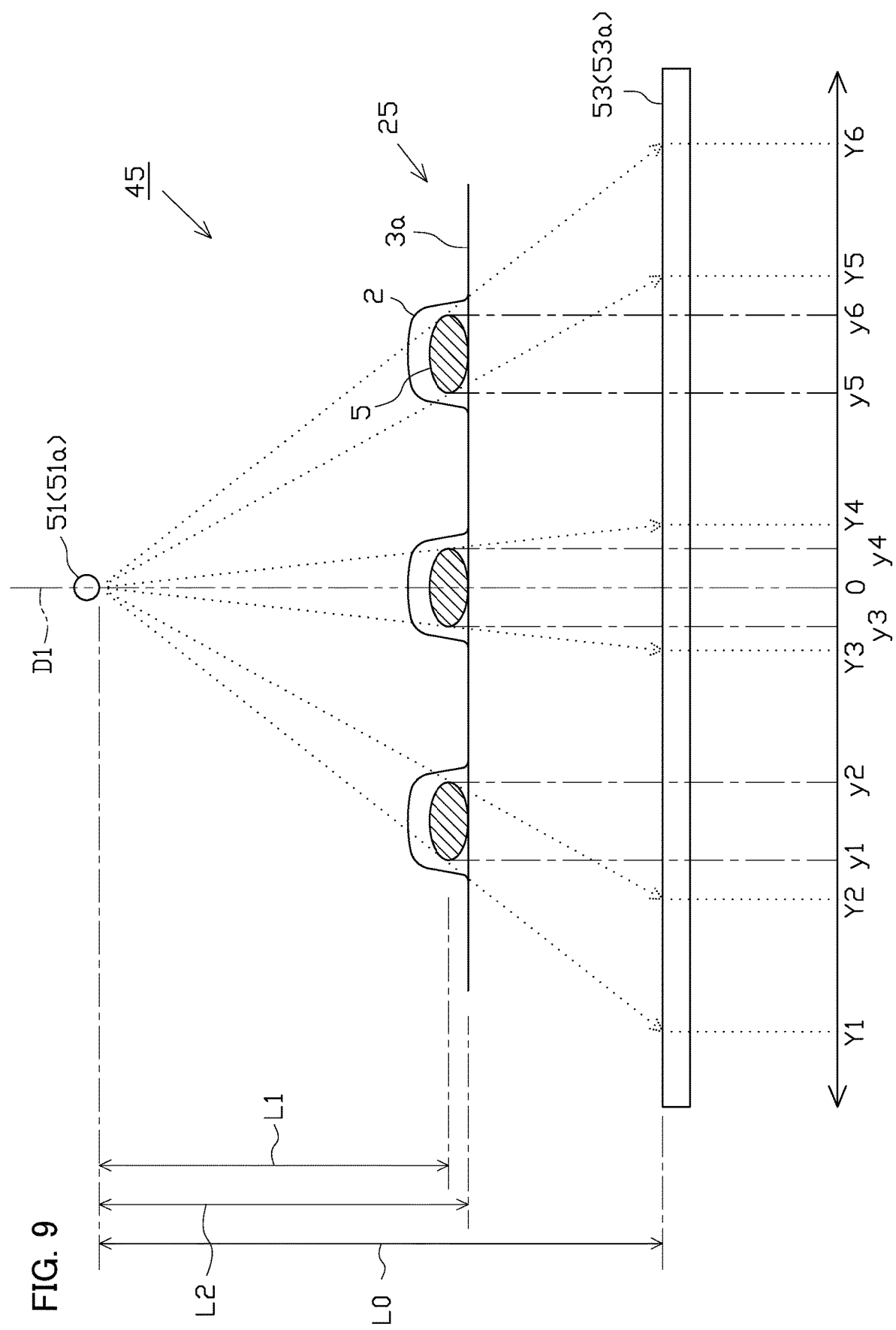
FIG. 9 is a schematic diagram illustrating the principle of a coordinate conversion process.

The coordinate conversion process is described first in detail with reference to FIG. 9. FIG. 9 is a schematic diagram illustrating the principle of the coordinate conversion process. In FIG. 9, the position of the center axis D1 of the X-ray irradiator 51 (the X-ray source 51a) in the film width direction (in the left-right direction of FIG. 9) and a film width direction central area of the PTP film 25 are set in a film width direction central area of the X-ray line sensor camera 53 (a light receiving surface of the X-ray line sensor 53a). Furthermore, in FIG. 9, the film width direction central area of the X-ray line sensor camera 53 is specified as an origin O in a coordinate system in the film width direction.

As shown in FIG. 9, in the X-ray inspection device 45, X-ray is radiated radially (in the fan beam shape) from the X-ray irradiator 51 toward the X-ray line sensor camera 53. Accordingly, X-rays transmitted through the PTP film 25 enter the respective X-ray detection elements of the X-ray line sensor 53a at different angles. Respective tablets 5 located at different positions in the film width direction of the PTP film 25 have different area values or the like in the X-ray transmission image data.

For example, a tablet 5 located on the left side of FIG. 9 has a diameter [y2–y1] on the PTP film 25 but is enlarged in a projected image to have a diameter [Y2–Y1] on the X-ray line sensor 53a. This tablet 5 has a larger enlargement ratio than that of a tablet 5 located at the center of FIG. 9.

The procedure of one or more embodiments accordingly converts a coordinate system of the X-ray transmission image data (a coordinate system on the X-ray line sensor 53a) into a coordinate system on the PTP film 25 according to Expression (α) given below with respect to the tablet 5 and according to Expression (β) given below with respect to the flange portion 3a.

$$Yn/L0 = yn/L1 \qquad (\alpha)$$
$$yn = \{Yn \times L1\}/L0$$
$$Yn/L0 = yn/L2 \qquad (\beta)$$
$$yn = \{Yn \times L2\}/L0$$

where L0 denotes a distance between the X-ray source 51a and the X-ray line sensor 53a; L1 denotes a distance between the X-ray source 51a and the tablet 5 (a center portion of the tablet 5); L2 denotes a distance between the X-ray source 51a and the flange portion 3a; Yn denotes a coordinate position in the coordinate system on the X-ray line sensor 53a; yn denotes a coordinate position in the coordinate system on the PTP film 25 (the tablet 5 or the flange portion 3a); and n denotes a natural number of not smaller than 1.

The distance L0, the distance L1 and the distance L2 described above are known values in design of the X-ray inspection device 45 and are stored in advance in the set data storage device 76. Yn is a coordinate value readable from the X-ray transmission image data that is obtained from the X-ray line sensor 53a.

The intensity correction process is described subsequently in detail. The intensity of X-ray radiated radially (in the fan beam shape) from the X-ray irradiator 51 toward the X-ray line sensor camera 53 attenuates in inverse proportion to the square of the distance. The X-ray transmitted through the PTP film 25 on an outer side in the film width direction rather than at the film width direction central area of the PTP film 25 has the smaller transmission amount of X-ray detected by the X-ray line sensor camera 53. The X-ray transmission image data is accordingly image data having a lower luminance value at a position corresponding to the outer side in the film width direction than at a position corresponding to the film width direction central area of the PTP film 25.

The procedure of one or more embodiments accordingly corrects the luminance values at the respective pixels in the X-ray transmission image data based on the positional relationships (distances) of the X-ray irradiator 51 and the X-ray line sensor camera 53, such that the PTP film 25 has the more uniform luminance values over an entire range in the film width direction.

The microcomputer 71 subsequently performs a binarization process at step S12. Specifically, the microcomputer 71 performs the binarization process for the respective corrective image data obtained at step S11 described above.

More specifically, the microcomputer 71 binarizes the corrective image data for tablet inspection by a tablet abnormality detection level to generate binarized image data and stores this generated binarized image data as binarized image data for tablet inspection into the image data storage device 74. The corrective image data for tablet inspection is converted into the binarized image data with setting, for example, the tablet abnormality detection level of not less than a first threshold value $\delta 1$ to "1 (light portion)" and the tablet abnormality detection level of less than the first threshold value $\delta 1$ to "0 (dark portion)".

The microcomputer 71 also binarizes the corrective image data for flange portion inspection by a flange abnormality detection level to generate binarized image data and stores this generated binarized image data as binarized image data for flange portion inspection into the image data storage device 74. The corrective image data for flange portion inspection is converted into the binarized image data with setting, for example, the flange abnormality detection level of not less than a second threshold value $\delta 2$ to "1 (light portion)" and the flange abnormality detection level of less than the second threshold value $\delta 2$ to "0 (dark portion)".

The microcomputer 71 then performs lump processing at step S13. More specifically, the microcomputer 71 processes the respective binarized image data obtained at step S12 described above, by the lump processing.

The lump processing performed includes a process of specifying linkage components with respect to "0 (dark portions)" and linkage components with respect to "1 (light portions)" in the binarized image data and a labeling process of labeling the respective linkage components. The occupied area of each of the specified linkage components is expressed by the number of dots corresponding to the pixels of the X-ray line sensor camera 53.

The microcomputer 71 subsequently performs an inspection object specification process at step S14.

More specifically, the microcomputer 71 specifies a linkage component corresponding to the tablet 5, i.e., a tablet area, among the linkage components of "0 (dark portions)" specified by the lump processing of step S13 described above, based on the binarized image data for tablet inspection. The linkage component corresponding to the tablet 5 may be specified by determining a linkage component including a predetermined coordinate, a linkage component having a predetermined shape, a linkage component having a predetermined area or the like.

The microcomputer 71 also specifies any linkage component of "0 (dark portion)" specified by the lump processing of step S13 described above, based on the binarized image data for flange portion inspection, as a linkage component corresponding to a foreign substance, i.e., a foreign substance area.

The microcomputer 71 then performs a masking process at step S15.

More specifically, the microcomputer 71 sets the sheet frame described above and defines the above inspection area Kb on the binarized image data for tablet inspection; sets the pocket frames described above corresponding to the positions of the ten pocket portions 2 on the binarized image data; and performs a masking process for a remaining area other than pocket areas thus specified, i.e., for an area corresponding to the flange portion 3*a*. Image data after this masking process is stored as masking image data for tablet inspection into the image data storage device 74.

The microcomputer 71 also sets the sheet frame described above and defines the above inspection area Kb on the binarized image data for flange portion inspection; sets the pocket frames described above corresponding to the positions of the ten pocket portions 2 on the binarized image data; and performs a masking process for pocket areas thus specified. Image data after this masking process is stored as masking image data for flange portion inspection into the image data storage device 74.

According to one or more embodiments, the set positions of the sheet frame and the pocket frame described above are determined in advance according to their relative positional relations to the PTP film 25. According to one or more embodiments, the set positions of the sheet frame and the pocket frame are thus not subjected to positioning or position adjustment every time according to an inspection image. This configuration is, however, not essential. Another employable configuration may appropriately adjust the set positions of the sheet frame and the pocket frame, based on information obtained from the inspection image by taking into account the occurrence of a positional misalignment or the like.

The microcomputer 71 subsequently sets a tablet non-defective flag to a value "0" for all the pocket portions 2 at step S16.

The "tablet non-defective flag" indicates the result of good/poor quality judgment with respect to a tablet 5 placed in each corresponding pocket portion 2 and is set in the calculation result storage device 75. In the case where a tablet 5 placed in a predetermined pocket portion 2 is determined as non-defective, the tablet non-defective flag corresponding to this tablet 5 is set to a value "1".

At subsequent step S17, the microcomputer 71 sets a value C of a pocket number counter provided in the calculation result storage device 75 to an initial value "1".

The "pocket number" denotes a serial number set corresponding to each of the ten pocket portions 2 included in the inspection area Kb with respect to one PTP sheet 1. The position of each pocket portion 2 is identifiable by the value C of the pocket number counter (hereinafter simply referred to as the "pocket number C").

The microcomputer 71 subsequently determines whether the pocket number C is equal to or less than a number of pockets N ("10" according to one or more embodiments) in each inspection area Kb (in each PTP sheet 1) at step S18.

In the case of a positive determination, the microcomputer 71 proceeds to step S19 to extract any lump having an area value of the above tablet area (linkage component) that is equal to or larger than a reference tablet area value Lo (remove any lump having the area value of smaller than Lo) in the pocket portion 2 corresponding to a current pocket number C (for example, C=1), based on the masking image data for tablet inspection described above.

The microcomputer 71 subsequently determines whether the number of lumps in the above pocket portion 2 is equal to "1" or not at step S20. In the case of a positive determination, i.e., when the number of lumps is equal to "1", the microcomputer 71 proceeds to step S21. In the case of a negative determination, on the other hand, the microcomputer 71 regards the tablet 5 placed in the pocket portion 2 corresponding to the current pocket number C as defective and directly proceeds to step S23.

At step S21, the microcomputer 71 determines whether the shape, the length, the area and the like of the tablet 5 are appropriate. In the case of a positive determination, the microcomputer 71 proceeds to step S22. In the case of a negative determination, on the other hand, the microcomputer 71 regards the tablet 5 placed in the pocket portion 2 corresponding to the current pocket number C as defective and directly proceeds to step S23.

The microcomputer 71 regards the tablet 5 placed in the pocket portion 2 corresponding to the current pocket number C as non-defective and sets the tablet non-defective flag corresponding to the current pocket number C to "1" at step S22 and then proceeds to step S23.

The microcomputer 71 subsequently adds "1" to the current pocket number C at step S23 and goes back to step S18.

When the newly set pocket number C is still equal to or smaller than the number of pockets N ("10" according to one or more embodiments), the microcomputer 71 proceeds to step S19 again and repeatedly performs the series of tablet inspection process described above.

When it is determined that the newly set pocket number C exceeds the number of pockets N, on the other hand, the microcomputer 71 regards that the good/poor quality judgment process is terminated with regard to the tablets 5 placed in all the pocket portions 2 and proceeds to step S24.

At step S24, the microcomputer 71 determines whether the flange portion 3a is non-defective. More specifically, the microcomputer 71 determines, for example, whether there is any foreign substance having the size equal to or larger than a predetermined size in the area of the flange portion 3a, based on the masking image data for flange portion inspection.

In the case of a positive determination, the microcomputer 71 proceeds to step S25. In the case of a negative determination, i.e., when it is determined that the flange portion 3a has any abnormality, on the other hand, the microcomputer 71 directly proceeds to step S27.

At step S25, the microcomputer 71 determines whether the value of the tablet non-defective flag is equal to "1" for all the pocket portions 2 included in the inspection area Kb. This determines whether the PTP sheet 1 corresponding to this inspection area Kb is a non-defective or a defective.

In the case of a positive determination, i.e., when the tablets 5 placed in all the pocket portions 2 included in the inspection area Kb are "non-defective" and there is no tablet 5 (no pocket portion 2) determined as "defective" in the inspection area Kb, the microcomputer 71 determines that the PTP sheet 1 corresponding to this inspection area Kb is a "non-defective" at step S26 and then terminates this inspection routine.

In the case of a negative determination at step S25, i.e., when there is any tablet 5 (any pocket portion 2) determined as "defective" in the inspection area Kb, on the other hand, the microcomputer 71 proceeds to step S27.

The microcomputer 71 determines that the PTP sheet 1 corresponding to this inspection area Kb is a "defective" at step S27 and then terminates this inspection routine.

The microcomputer 71 stores the result of the inspection with respect to the PTP sheet 1 corresponding to the inspection area Kb into the calculation result storage device 54 and outputs the result of the inspection to the PTP packaging machine 10 (including the defective sheet discharge mechanism) in the non-defective determination process of step S26 or in the defective determination process of step S27. Accordingly, the series of processing of step S12 to step S27 described above configures the "inspection process" according to one or more embodiments, and the function of the microcomputer 71 to perform this processing configures the "inspection unit".

As described above in detail, the configuration of one or more embodiments irradiates the continuously conveyed PTP film 25 with the X-ray radiated from the X-ray irradiator 51, takes an image of the X-ray transmitted through the PTP film 25 with the X-ray line sensor camera 53 every time the PTP film 25 is conveyed by the predetermined amount, and performs an inspection with respect to the PTP sheet 1, based on the obtained X-ray transmission image data.

Especially, the configuration of one or more embodiments performs the process of converting the coordinate system of the X-ray transmission image data obtained by the X-ray line sensor camera 53 into the coordinate system of the PTP film 25, before performing the inspection with respect to the PTP sheet 1. This configuration corrects the X-ray transmission image data including projected images of the tablets 5 enlarged to different sizes due to the difference in position of the tablet 5 in the film width direction of the PTP film 25.

This configuration accordingly enables the good/poor quality judgment to be performed with respect to each of the inspection items (the tablet inspection and the flange portion inspection), on the basis of the judgment criterion common to the entire area of the PTP sheet 1 (the entire inspection range WA). In other words, this configuration enables a uniform inspection to be performed for the entire area of the PTP sheet 1 (the entire inspection range WA) without setting a plurality of judgment criteria with respect to an identical inspection item according to the respective positions in the film width direction of the PTP film 25. As a result, this configuration suppresses reduction of the inspection accuracy.

The present invention is not limited to the description of the above respective embodiments but may be implemented, for example, by configurations described below. One or more embodiments of the present invention may also be naturally implemented by applications and modifications other than those illustrated below.

(a) The configuration of the sheet-type package (packaging sheet) is not limited to the PTP sheet 1 described in the above embodiments. For example, the inspection object may be an SP sheet.

Figure 10:
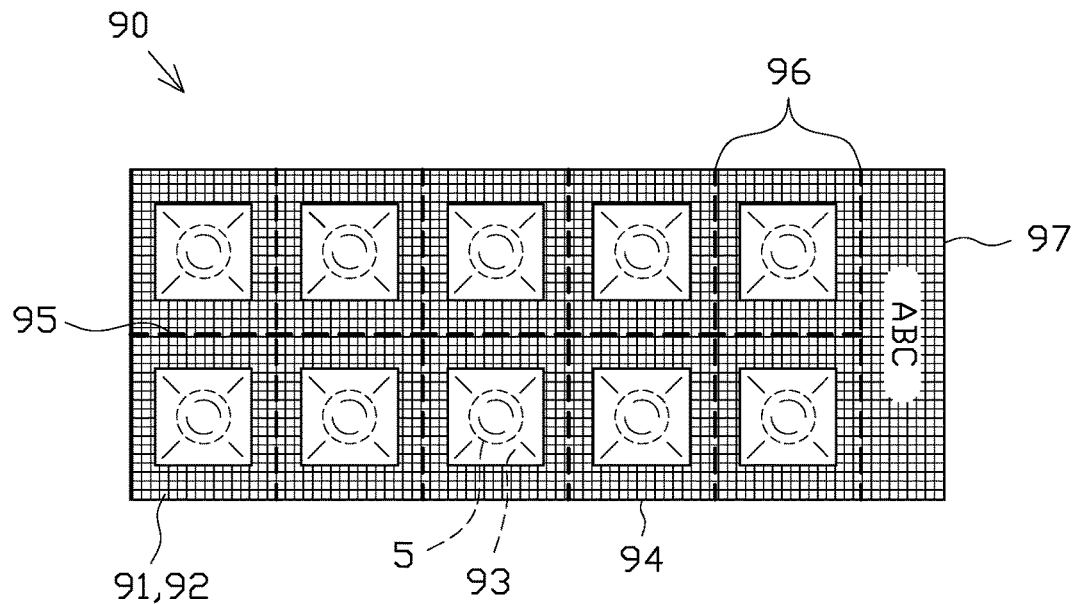
FIG. 10 is a plan view illustrating an SP sheet.

As shown in FIG. 10, a general SP sheet 90 is formed by laying two belt-like films 91 and 92 made of an aluminum-based opaque material one over the other, filling tablets 5 between the two films 91 and 92, joining the two films 91 and 92 with each other in peripheries of bag-like spaces 93 (shaded areas in FIG. 10) with leaving the bag-like spaces 93 around the tablets 5 to form a belt-like package, and separating the belt-like package in the unit of rectangular sheets.

The SP sheet 90 has a vertical perforation 95 formed along a sheet longitudinal direction and lateral perforations 96 formed along a sheet short side direction, as separation lines for separating the SP sheet 90 in the unit of small sheet pieces 94, each including one space 93. Furthermore, the SP sheet 90 is provided with a tag portion 97 with various pieces of information (a letter string "ABC" according to one or more embodiments) printed thereon, at one end in the sheet longitudinal direction.

(b) The arrangement and the number of the pocket portions 2 in one unit of PTP sheet 1 are not limited to the configuration of the above embodiments (the total of ten pocket portions 2 arrayed in two lines). One or more embodiments of the present invention may be applied to a PTP sheet having any of various arrangements and any number of pocket portions, for example, a PTP sheet having a total of twelve pocket portions 2 (spaces 2*a*) arrayed in three lines (the same applies to the SP sheet described above). The number of pocket portions (spaces) included in one small sheet piece is also not limited to the configuration of the above embodiments.

(c) The PTP sheet 1 according to the above embodiments has the perforations 7 formed by intermittently aligning the cuts penetrating in the thickness direction of the PTP sheet 1, as the separation lines. The separation lines are, however, not limited to this configuration, but a different configuration may be employed according to the materials of the container film 3 and the cover film 4 and the like. For example, another configuration may form non-penetrating separation lines such as slits having an approximately V-shaped cross section (half separation lines). Another configuration may form no separation lines such as the perforations 7.

Furthermore, in the configuration of the above embodiments, the constricted portions 8 are formed corresponding to the positions where the perforations 7 are formed in the periphery of the PTP sheet 1. Another configuration may omit the constricted portions 8.

(d) The materials, the layered structure and the like of the first film and the second film are not limited to the configuration of the container film 3 and the cover film 4 according to the embodiments described above. For example, in the configuration of the above embodiments, the container film 3 and the cover film 4 are made by using the metal material such as aluminum as the base material. This is, however, not essential, but another materials may be employed. For example, a synthetic resin material that does not allow for transmission of visible light and the like may be employed.

(e) The configuration of the belt-like package is not limited to the configuration of the above embodiments, but another configuration may be employed.

For example, in the configuration of the above embodiments, two PTP sheets 1 are manufactured simultaneously in the width direction of the PTP film 25. In place of this configuration, another configuration may be employed to manufacture one PTP sheet 1 or three or more PTP sheets 1 simultaneously in the width direction of the PTP film 25.

However, in one or more embodiments, the arrangement layout of the pocket portions is symmetric in the film width direction with respect to the film width direction central area of the PTP film 25.

Figure 11:
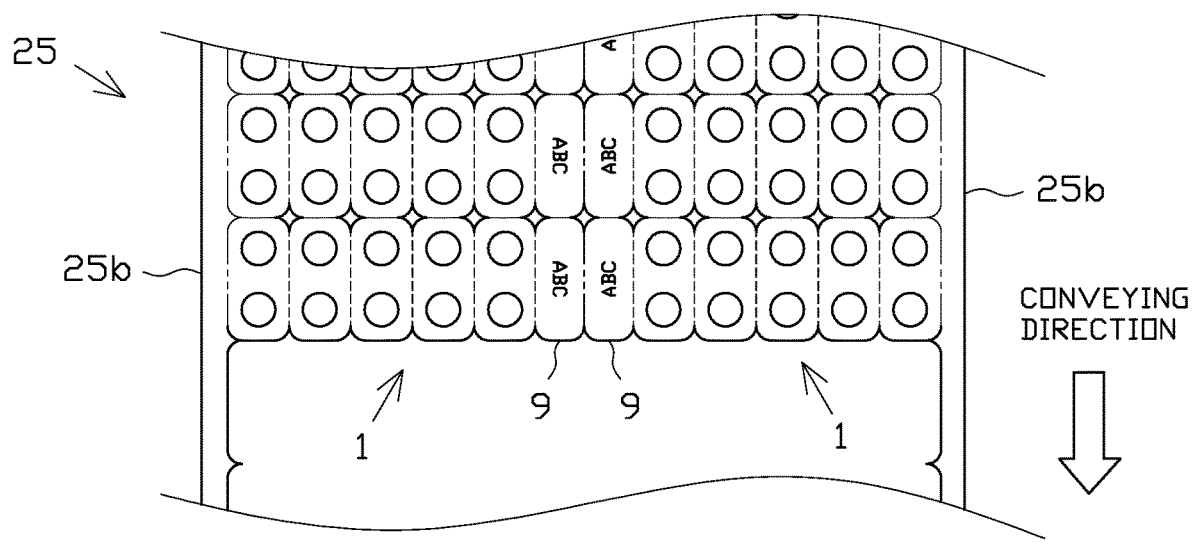
FIG. 11 is a schematic configuration diagram illustrating a layout of a PTP film according to one or more embodiments.

For example, in the layout of the PTP film 25 according to one or more embodiments, the center scrap 25*a* is present between the two sheet punchout ranges Ka aligned in the film width direction. This configuration is, however, not essential. As shown in FIG. 11, in another layout with omission of the center scrap 25*a*, areas corresponding to the tag portions 9 of the two PTP sheets 1 aligned in the film width direction may be arranged to be directly connected with each other.

Figure 12:
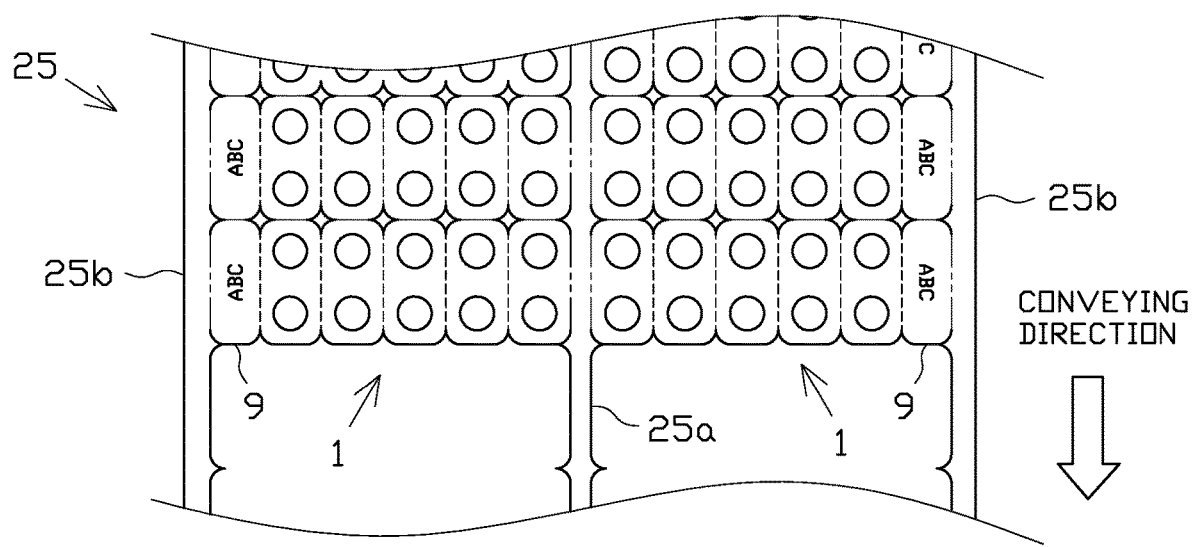
FIG. 12 is a schematic configuration diagram illustrating a layout of a PTP film according to one or more embodiments.

According to the embodiments described above, in the PTP film 25, the two PTP sheets 1 aligned in the film width direction respectively have the tag portions 9 arranged to face the film width direction central area and to be adjacent to the center scrap 25*a*. This configuration is, however, not essential. As shown in FIG. 12, in another layout, the tag portions 9 of the two PTP sheets aligned in the film width direction may be arranged to respectively face outward in the film width direction and to be adjacent to the side scraps 25*b*.

(f) The configuration of the electromagnetic wave irradiation unit is not limited to the configuration of the above embodiments. The above embodiments are configured to radiate X-ray as the electromagnetic wave. This configuration is, however, not essential. Another configuration may use another electromagnetic wave that transmits through the PTP film 25, for example, terahertz electromagnetic wave.

(g) The configuration of the imaging unit is not limited to the configuration of the above embodiments. For example, the above embodiments employ the scintillator-based CCD camera (the X-ray line sensor camera 53) as the imaging unit. This is, however, not essential. A camera configured to take an image of directly incident X-ray may be employed as the imaging unit.

The above embodiments employ the X-ray line sensor camera 53 having CCDs arrayed in a line, as the imaging unit. Using the X-ray line sensor camera is, however, not essential. For example, an X-ray area sensor camera, such as an X-ray TDI (time delay integration) camera including multiple arrays of CCDs (arrays of detection elements) in the film conveying direction of the PTP film 25 may be employed as the imaging unit. This further improves the inspection accuracy and the inspection efficiency.

(h) The arrangement position of the X-ray inspection device 45 is not limited to the position of the embodiments described above. For example, in the configuration of the above embodiments, the X-ray inspection device 45 is placed at the position where the PTP film 25 is conveyed in the vertical direction. This configuration is, however, not essential. For example, the X-ray inspection device 45 may be placed at a position where the PTP film 25 is conveyed in the horizontal direction or at a position where the PTP film 25 is conveyed obliquely.

The above embodiments are configured to perform the X-ray inspection by the X-ray inspection device 45 in a previous process before the PTP sheet 1 is punched out from the PTP film 25. This configuration is, however, not essential. A modified configuration may be employed to perform the inspection for the PTP sheet 1 conveyed by the conveyor 39 in a post process after the PTP sheet 1 is punched out from the PTP film 25.

In this modified configuration, the configuration of the inspection device 45 provided in the PTP packaging machine 10 (inline configuration) may be replaced by an offline configuration where the inspection device 45 is provided as a device for performing an offline inspection of the PTP sheet 1, separately from the PTP packaging machine 10. In this offline configuration, the inspection device 45 may be provided with a transfer unit configured to convey the PTP sheet 1.

In the case of offline inspection, however, the position and the direction of the PTP sheet 1 as the inspection object are not fixed relative to the inspection device 45. It is accordingly required to adjust the position and the direction of the PTP sheet 1 prior to the inspection. As a result, this is likely to decrease the inspection speed and the inspection accuracy.

Recently, in the field of manufacturing the PTP sheets 1 and the like, it has been demanded to increase the speeds of various inspections accompanied with an increase in production speed. For example, in the case where an inspection is performed on the PTP packaging machine 10, it may be demanded to process a hundred or more tablets 5 per second. The inline inspection is accordingly executed with a view to improving the productivity.

(i) The arrangement configuration of the electromagnetic wave irradiation unit and the imaging unit is not limited to that of the embodiments described above.

For example, in the configuration of the above embodiments, the X-ray irradiator 51 is placed on the container film 3-side of the PTP film 25, and the X-ray line sensor camera 53 is placed on the cover film 4-side of the PTP film 25. In a modified configuration, the positional relationship of these components may be inverted, such that the X-ray irradiator 51 is placed on the cover film 4-side and that the X-ray line sensor camera 53 is placed on the container film 3-side. In the latter case, the "container film 3" configures the "second film", and the "cover film 4" configures the "first film".

(j) The configuration of the X-ray inspection device 45 is not limited to the configuration of the above embodiments. For example, in a modified configuration, the X-ray inspection device 45 may be provided with a position adjustment mechanism (a position adjustment unit) configured to adjust the position of at least one of the X-ray irradiator 51 and the X-ray line sensor camera 53 in at least one direction out of the film width direction, the film conveying direction and the film normal direction according to the dimensions and the layout of the PTP film 25. This configuration enhances the versatility of the X-ray inspection device 45 and improves the inspection accuracy.

(k) The X-ray inspection device 45 may be provided with, for example, a non-illustrated predetermined guide unit to curve the PTP film 25 in an arc shape such as to be convex to the X-ray line sensor camera 53-side and to convey the PTP film 25 in such a state that the respective positions in the film width direction of the PTP film 25 (the tablet 5 or the flange portion 3a) have equal distances from the X-ray irradiator 51 (as shown in FIG. 13).

This configuration minimizes or even eliminates a difference in incident angle of X-ray at the respective positions in the film width direction of the PTP film 25 (the tablet 5 or the flange portion 3a).

Th coordinate conversion process of converting the coordinate system of the X-ray transmission image data (the coordinate system on the X-ray line sensor 53a) into the coordinate system on the PTP film 25 under the above configuration is described in detail below with reference to FIG. 13.

The coordinate system of the PTP film 25 (the tablet 5 or the flange portion 3a) is an arc-shaped coordinate system along the curved PTP film 25. In this arc-shaped coordinate system, a coordinate position expressed as "En" of the tablet 5 and a coordinate position "En" of the flange portion 3a are respectively determined according to Expression ($\alpha'$) and Expression ($\beta'$) given below:

$$Yn/L0 = \tan\phi(Yn) \quad (\alpha')$$

$$\phi(Yn) = \arctan(Yn/L0)$$

-continued $$En = 2\pi \times Ra \times \phi(Yn)/2\pi$$

$$En = 2\pi \times Rb \times \phi(Yn)/2\pi \quad (\beta')$$

where L0 denotes a distance between the X-ray source 51a and the X-ray line sensor 53a; Ra denotes a distance between the X-ray source 51a and the tablet 5 (a center portion of the tablet 5); Rb denotes a distance between the X-ray source 51a and the flange portion 3a; Yn denotes a coordinate position in the coordinate system on the X-ray line sensor 53a; $\phi(Yn)$ denotes an incident angle of X-ray entering the coordinate position Yn; and n denotes a natural number of not smaller than 1.

The distance L0, the distance Ra and the distance Rb described above are known values in design of the X-ray inspection device 45 and are stored in advance in the set data storage device 76. Yn is a coordinate value readable from the X-ray transmission image data that is obtained from the X-ray line sensor 53a.

The following describes in detail the effect of curving the PTP film 25 in an arc shape such as to be convex to the X-ray line sensor camera 53-side.

As described above, X-ray is radiated radially from the X-ray irradiator 51. In the case where the PTP film 25 is conveyed in the horizontal state along the film width direction like the above embodiments, the tablet 5 at a position deviated from the film width direction central area of the PTP film 25 is obliquely irradiated with X-ray. The respective tablets 5 located at different positions in the film width direction of the PTP film 25 have different incident angles of X-ray.

Even when each tablet 5 is irradiated obliquely with parallel light and is projected to a predetermined imaging unit by parallel projection, the tablet 5 may have a large projected image on the imaging unit, depending on the shape of the tablet 5. A difference in incident angle of parallel light is also likely to cause a difference in the size of the projected image.

Figure 14A:
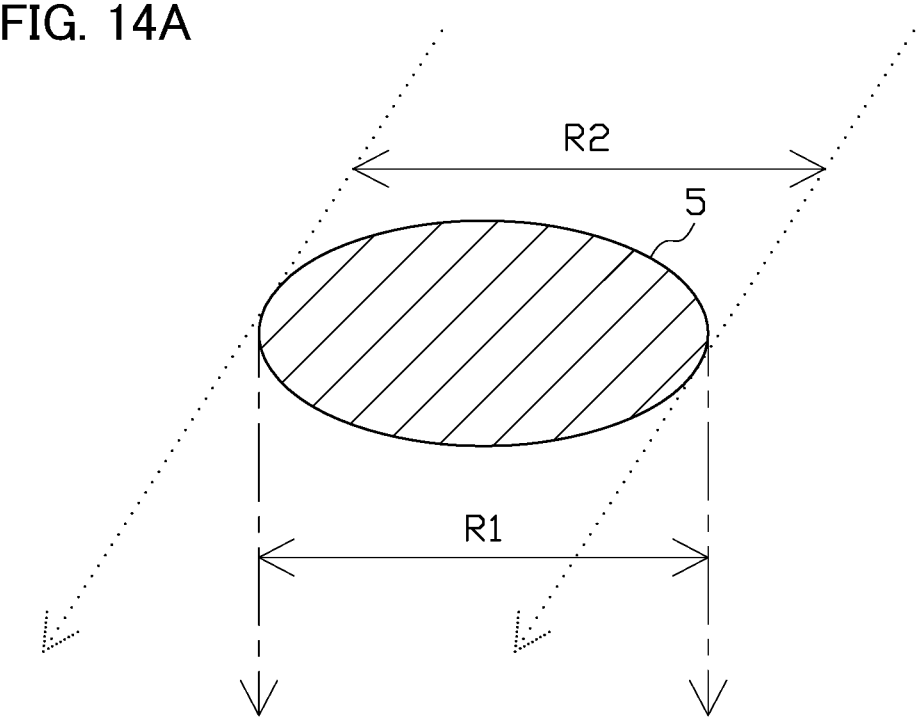
FIG. 14A is a schematic diagram illustrating comparison between the actual size of a lens-shaped tablet and the size of its projected image.

For example, as shown in FIG. 14A, when the tablet 5 is a lens-shaped tablet like the embodiments described above, there is no substantial influence of the incident angle of parallel light on the size of the projected image ([actual size R1 of the tablet 5]≈[size R2 of the projected image]).

Figure 14B:
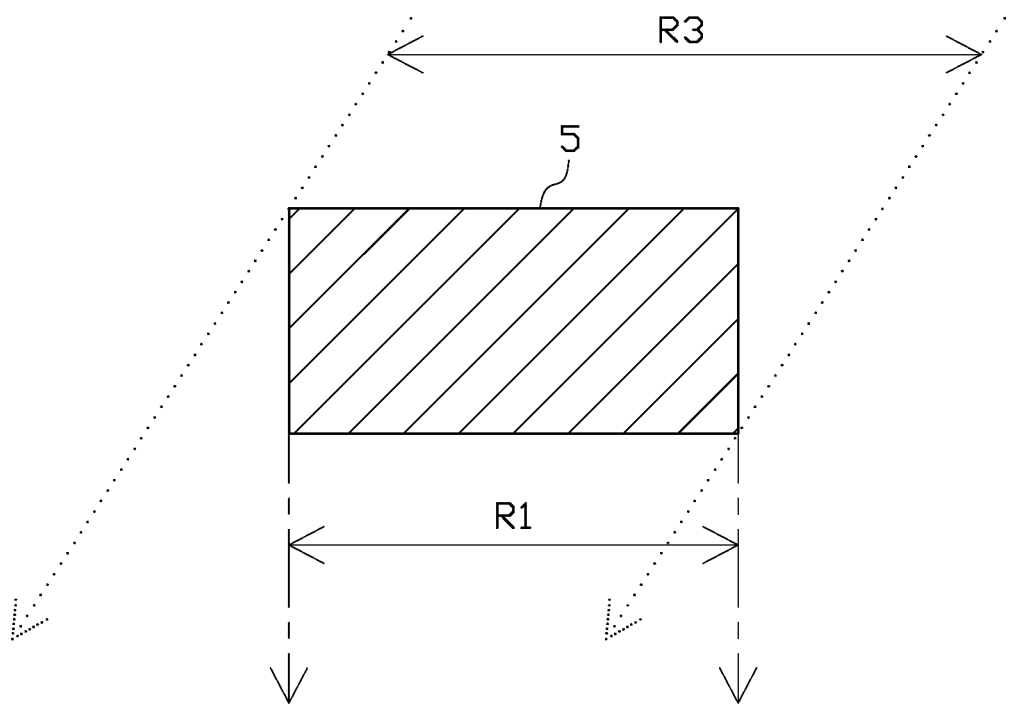
FIG. 14B is a schematic diagram illustrating comparison between the actual size of a cylindrical tablet and the size of its projected image.

As shown in FIG. 14B, when the tablet 5 is a cylindrical tablet in a cylindrical shape having a rectangular sectional shape, on the other hand, there is a relatively large influence of the incident angle of parallel light on the size of the projected image ([actual size R1 of the tablet 5]<[size R3 of the projected image]). Especially the tablet 5 (cylindrical tablet) having the larger thickness has the more prominent influence (R1<<R3).

One employable configuration may correct the X-ray transmission image data (R3→R1) with respect to each of tablets 5 located at a plurality of different positions in the film width direction by taking into account the influence of the incident angle of parallel light on the projected image of the tablet 5 described above, in addition to the coordinate conversion process of step S11 described above.

Figure 15:
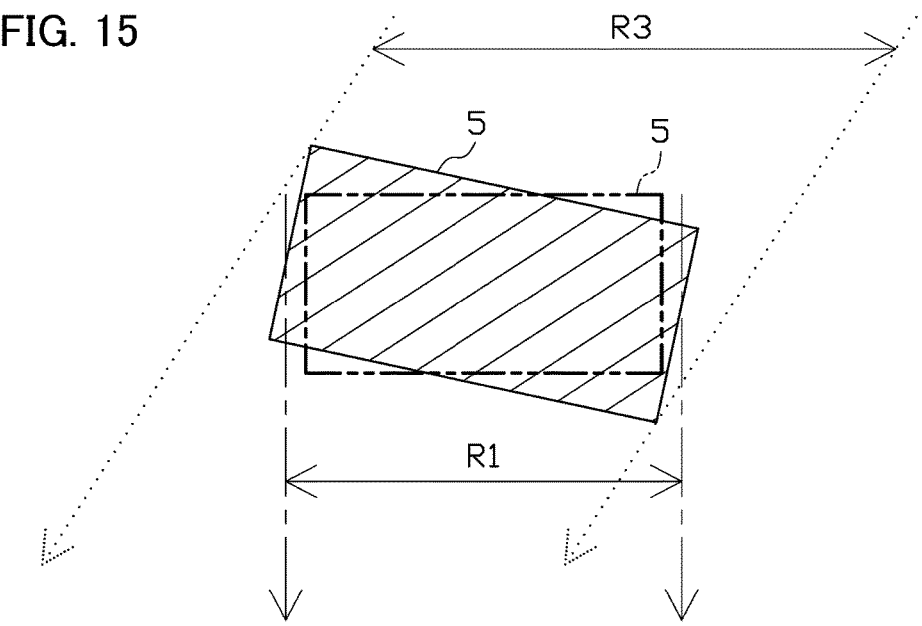
FIG. 15 is a schematic diagram illustrating comparison between the actual size of a cylindrical tablet in an inclined position, the size of its projected image, and a corrected size.

Under the configuration of performing such correction, however, in the case where the tablet 5 (cylindrical tablet) has an inclined position in the pocket portion 2 as shown in FIG. 15, such correction of this tablet 5 gives a smaller apparent size (as shown by the two-dot chain line in FIG. 15). This may fail to perform an appropriate inspection.

The configuration of curving the PTP film 25 in an arc shape such as to be convex to the X-ray line sensor camera 53-side as described above, on the other hand, minimizes or even eliminates a difference in incident angle of X-ray entering the tablets 5 located at a plurality of different positions in the film width direction of the PTP film 25. As a result, this configuration reduces the occurrence of the issues described above.

Figure 16:
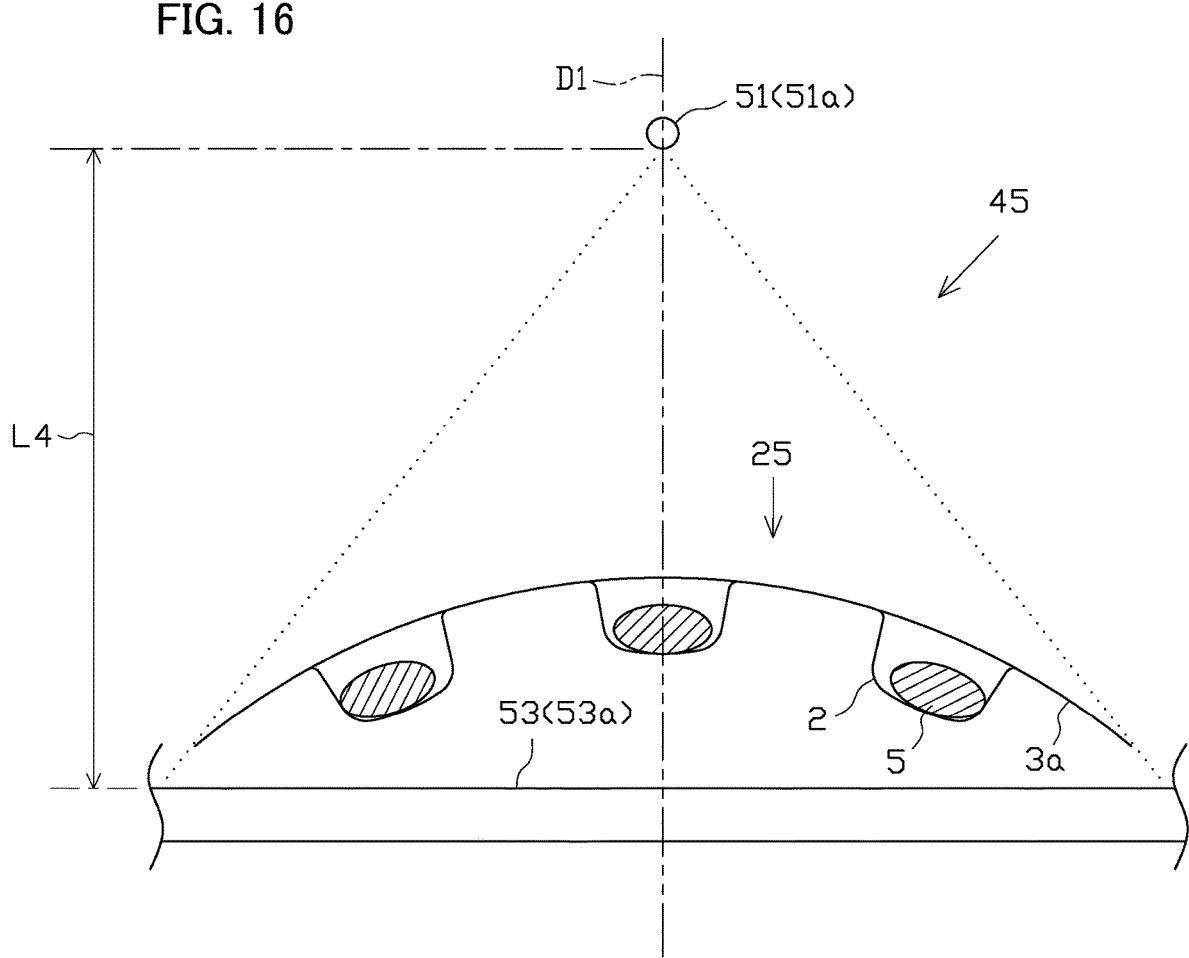
FIG. 16 is a schematic diagram illustrating a positional relationship between the X-ray irradiator, the X-ray line sensor camera and the PTP film according to one or more embodiments.

(1) As shown in FIG. 16, in another configuration of the X-ray inspection device 45, the X-ray irradiator 51 may be placed on the cover film 4-side of the PTP film 25, and the X-ray line sensor camera 53 may be placed on the container film 3-side of the PTP film 25. The X-ray inspection device 45 may be provided with, for example, a non-illustrated predetermined guide unit to convey the PTP film 25 in such a state that the PTP film 25 is curved in an arc shape to be convex to the X-ray irradiator 51-side.

This configuration causes the protrusion side of the pocket portions 2 to be located on an inner side (concave side) of the PTP film 25 curved in an arc shape and thereby causes the entire PTP film 25 to be placed in a narrower width range.

This configuration decreases a distance L4 between the X-ray irradiator 51 and the X-ray line sensor camera 53 to be shorter than the distance L0 of the embodiments described above, while keeping the entire PTP film 25 in the irradiation range of X-ray without increasing the irradiation angle (spread in the width direction) of X-ray radiated from the X-ray irradiator 51 to be larger than that of the conventional configuration. As a result, this achieves downsizing of the X-ray inspection device 45.

Additionally, shortening the distance between the X-ray irradiator 51 and the X-ray line sensor camera 53 readily ensures a sufficient transmission amount of X-ray required for the inspection and improves the inspection accuracy. This also enables a lower-power, small-size device to be employed for the X-ray irradiator 51 and thereby achieves further downsizing of the inspection device.

(m) The X-ray inspection device 45 may be configured to convey the PTP film 25 in such a state that the protrusion side of the pocket portions 2 faces downward and that a protrusion-side end face (a top) of the pocket portion 2 is curved in an arc shape outward. In the case where the tablet 5 has a curved surface like the lens-shaped tablet of the embodiments described above, this configuration further stabilizes the position of the tablet 5 and further improves the inspection accuracy.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 1a . . . sheet main body, 2 . . . pocket portion, 2a . . . space, 3 . . . container film, 4 . . . cover film, 5 . . . tablet, 6 . . . small sheet piece, 7 . . . perforation, 8 . . . constricted portion, 9 . . . tag portion, 10 . . . PTP packaging machine, 25 . . . PTP film, 25a . . . center scrap, 25b . . . side scrap, 45 . . . X-ray inspection device, 51 . . . X-ray irradiator, 51a . . . X-ray source, 53 . . . X-ray line sensor camera, 54 . . . control processing device, 71 . . . microcomputer, 74 . . . image data storage device, L0 . . . distance between X-ray source and X-ray line sensor, L1 . . . distance between X-ray source and tablet, L2 . . . distance between X-ray source and flange portion, Yn . . . coordinate position in coordinate system on X-ray line sensor, yn . . . coordinate position in coordinate system on PTP film

What is claimed is:

1. An inspection device that inspects a package comprising a first film made of an opaque material and a second film made of an opaque material attached to each other and a plurality of spaces each for placing a tablet between the first film and the second film, the inspection device comprising:
an electromagnetic wave irradiator that irradiates, with a predetermined electromagnetic wave from a first film side, the package that is conveyed along a predetermined direction and that has the spaces at a plurality of positions in a width direction perpendicular to the predetermined direction;
an imaging device that
is disposed opposed to the electromagnetic wave irradiator across the package,
comprises an electromagnetic wave detector comprising a plurality of detection elements that is arrayed along the width direction and that detects the electromagnetic wave radiated from the electromagnetic wave irradiator and transmitted through the package, and
sequentially outputs an obtained electromagnetic wave transmission image every time the package is conveyed by a predetermined amount; and
an image processing device that processes an image signal output from the imaging device, wherein
the image processing device comprises:
a processor that:
converts a coordinate system of the electromagnetic wave transmission image obtained by the imaging device into a coordinate system of the package based on a positional relationship among the electromagnetic wave irradiator, the package, and the imaging device, and
inspects the package based on the electromagnetic wave transmission image converted into the coordinate system of the package.

2. The inspection device according to claim 1, wherein the package is conveyed while being curved in the width direction in an arc shape and protruding toward the imaging device.

3. The inspection device according to claim 1, wherein the package is a press through package that comprises a pocket portion defining each of the spaces, wherein the pocket portion is formed in the second film and protrudes toward the imaging device, and
the package is conveyed while being curved in the width direction in an arc shape and protruding toward the electromagnetic wave irradiator.

4. The inspection device according to claim 1, wherein the package is a belt-like package formed by attaching the first film in a belt-like form and the second film in a belt-like form to each other,
two sheet-type packages are separated from the belt-like package, wherein the two sheet-type packages are respectively within sheet cutting ranges set at two positions in the width direction of the belt-like package, and
the two sheet-type packages are aligned in the width direction symmetrically with respect to a width direction central area of the belt-like package that intersects with a center axis of the electromagnetic wave irradiator, and the two sheet-type packages respectively include tag portions that face the width direction central area of the belt-like package or face outward in the width direction of the belt-like package.

5. The inspection device according to claim 1, wherein the processor further corrects a value of each pixel of the electromagnetic wave transmission image based on a positional relationship between the electromagnetic wave irradiator and the imaging device.

6. The inspection device according to claim 1, wherein the processor further:
    converts the coordinate system of the electromagnetic wave transmission image obtained by the imaging device into a coordinate system based on at least the tablet and a coordinate system based on a flange portion of the package around the space,
    inspects the tablet based on the electromagnetic wave transmission image converted into the coordinate system based on at least the tablet, and
    also inspects the flange portion based on the electromagnetic wave transmission image converted into the coordinate system based on the flange portion.

7. The inspection device according to claim 1, wherein the electromagnetic wave is X-ray or terahertz electromagnetic wave.

8. The inspection device according to claim 1, wherein the first film and the second film are formed using aluminum as a base material.

9. A packaging machine, comprising:
the inspection device according to claim 1.

10. A packaging machine, comprising:
the inspection device according to claim 2.

11. A packaging machine, comprising:
the inspection device according to claim 3.

12. A packaging machine, comprising:
the inspection device according to claim 4.

13. A packaging machine, comprising:
the inspection device according to claim 5.

14. A packaging machine, comprising:
the inspection device according to claim 6.

15. A packaging machine, comprising:
the inspection device according to claim 7.

16. A packaging machine, comprising:
the inspection device according to claim 8.

17. A method of inspecting a package comprising a first film made of an opaque material and a second film made of an opaque material attached to each other and a plurality of spaces each for placing a tablet between the first film and the second film, the method comprising:
    irradiating, with a predetermined electromagnetic wave by an electromagnetic wave irradiator from a first film side, the package that is conveyed along a predetermined direction and that has the spaces at a plurality of positions in a width direction perpendicular to the predetermined direction;
    every time the package is conveyed by a predetermined amount, sequentially outputting an electromagnetic wave transmission image obtained by detecting electromagnetic wave transmitted through the package by using an imaging device disposed opposed to the electromagnetic wave irradiator across the package;
    converting a coordinate system of the electromagnetic wave transmission image into a coordinate system of the package based on a positional relationship among the electromagnetic wave irradiator, the package, and the imaging device; and
    inspecting the package based on the electromagnetic wave transmission image converted into the coordinate system of the package.

* * * * *